United States Patent
Valko et al.

(10) Patent No.: US 12,370,411 B1
(45) Date of Patent: Jul. 29, 2025

(54) INTERFACES AND METHODS FOR REPRESENTING COORDINATED OBJECTIVES

(71) Applicant: META PLATFORMS TECHNOLOGIES, LLC, Menlo Park, CA (US)

(72) Inventors: Andrew Valko, Berkeley, CA (US); Christine Eun, Menlo Park, CA (US); Christopher Jordan Weems, Sarasota, FL (US); Dinesh Kumar Challa, Fremont, CA (US); Willy Huang, San Francisco, CA (US); Jordan McQuade, Oakland, CA (US); Chandra Mohan Janakiraman, Sunnyvale, CA (US); John Matthew Delacruz, Redwood City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 601 days.

(21) Appl. No.: 17/566,344

(22) Filed: Dec. 30, 2021

Related U.S. Application Data

(60) Provisional application No. 63/132,246, filed on Dec. 30, 2020.

(51) Int. Cl.
*A63B 24/00* (2006.01)
*A63B 71/06* (2006.01)
(Continued)

(52) U.S. Cl.
CPC ...... *A63B 24/0084* (2013.01); *A63B 71/0622* (2013.01); *G06F 3/0482* (2013.01);
(Continued)

(58) Field of Classification Search
CPC ...... A63B 24/00–0087; A63B 2024/009–0096
See application file for complete search history.

(56) References Cited

U.S. PATENT DOCUMENTS 6,885,971 B2 * 4/2005 Vock .............. G01P 3/42
  702/182
8,360,936 B2 * 1/2013 DiBenedetto ........ A44C 5/0007
  482/901

(Continued)

FOREIGN PATENT DOCUMENTS

CA      2815518 C  * 2/2019 .............. A61B 5/08
WO  WO-2011028383 A1 * 3/2011 ......... A63B 24/0062

*Primary Examiner* — Nyca T Nguyen
(74) *Attorney, Agent, or Firm* — Morgan, Lewis & Bockius LLP

(57) ABSTRACT

The disclosed computer-implemented method may include receiving an input identifying, for a group of users, a group fitness objective that is attainable through a combined effort of multiple individual users within the group of users. The method may also include tracking, via sensor data received from hardware sensors, an individual user's efforts with respect to the identified group fitness objective. The method may further include generating a combined user interface that illustrates both an individual progress indicator illustrating the individual user's efforts with respect to the group fitness objective, and a group progress indicator illustrating the group of users' efforts with respect to the group fitness objective. Furthermore, the method may include presenting the combined user interface on a display. Various other methods, systems, and computer-readable media are also disclosed.

20 Claims, 29 Drawing Sheets

US 12,370,411 B1
Page 2

(51) Int. Cl.
 *G06F 3/0482* (2013.01)
 *G06F 3/0484* (2022.01)

(52) U.S. Cl.
 CPC .... *G06F 3/0484* (2013.01); *A63B 2024/0065* (2013.01); *A63B 2024/0068* (2013.01); *A63B 2220/12* (2013.01); *A63B 2220/16* (2013.01); *A63B 2220/40* (2013.01); *A63B 2220/805* (2013.01); *A63B 2220/89* (2013.01); *A63B 2225/20* (2013.01); *A63B 2230/04* (2013.01)

(56) References Cited

U.S. PATENT DOCUMENTS

| | | | | |
|---|---|---|---|---|
| 8,920,287 B2* | 12/2014 | Doshi | | A61B 5/1118 482/8 |
| 11,033,777 B1* | 6/2021 | Watterson | | A63B 22/0076 |
| 2006/0040793 A1* | 2/2006 | Martens | | G16H 20/30 482/8 |
| 2006/0136173 A1* | 6/2006 | Case, Jr. | | G01C 22/006 702/182 |
| 2008/0033581 A1* | 2/2008 | Doshi | | A63B 71/06 700/92 |
| 2009/0063049 A1* | 3/2009 | Swisher | | A63B 24/0062 701/469 |
| 2009/0258710 A1* | 10/2009 | Quatrochi | | G09B 19/0038 463/43 |
| 2011/0003665 A1* | 1/2011 | Burton | | G06F 13/4282 482/8 |
| 2012/0253487 A1* | 10/2012 | Dugan | | A63F 13/211 700/91 |
| 2012/0253489 A1* | 10/2012 | Dugan | | A63F 13/428 700/91 |
| 2013/0041590 A1* | 2/2013 | Burich | | G16H 40/63 702/19 |
| 2013/0204410 A1* | 8/2013 | Napolitano | | A63B 24/0003 700/91 |
| 2014/0135173 A1* | 5/2014 | Watterson | | A63B 24/0087 482/8 |
| 2017/0344726 A1* | 11/2017 | Duffy | | A63B 71/0622 |
| 2017/0368413 A1* | 12/2017 | Shavit | | A63B 24/0075 |
| 2018/0117475 A1* | 5/2018 | Dugan | | A63F 13/332 |
| 2018/0178063 A1* | 6/2018 | Silver | | G16H 40/67 |
| 2018/0227706 A1* | 8/2018 | Cho | | H04W 4/023 |
| 2018/0345077 A1* | 12/2018 | Blahnik | | A63B 71/0622 |
| 2019/0184234 A1* | 6/2019 | Packles | | A63B 24/0087 |
| 2019/0255386 A1* | 8/2019 | Trotter | | A63B 24/0062 |
| 2020/0139194 A1* | 5/2020 | Min | | A63B 24/0084 |
| 2020/0376335 A1* | 12/2020 | Wan | | A63B 71/0622 |
| 2021/0128977 A1* | 5/2021 | Picker | | G06F 3/0488 |
| 2022/0134182 A1* | 5/2022 | Hughes | | G06F 1/163 482/8 |

* cited by examiner

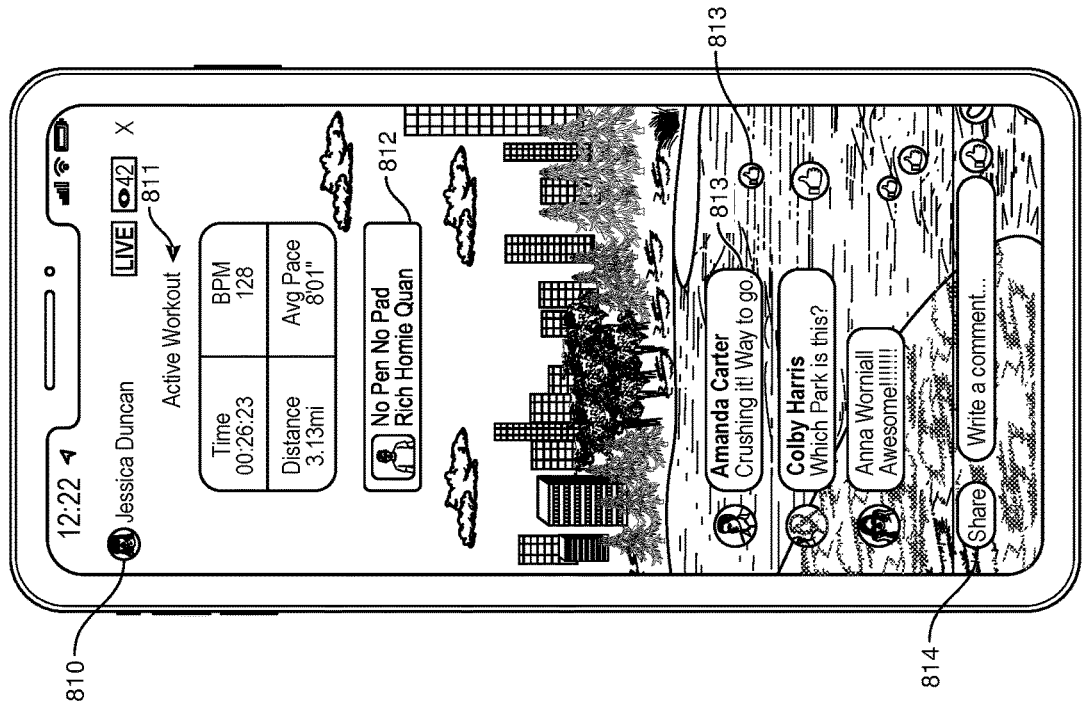
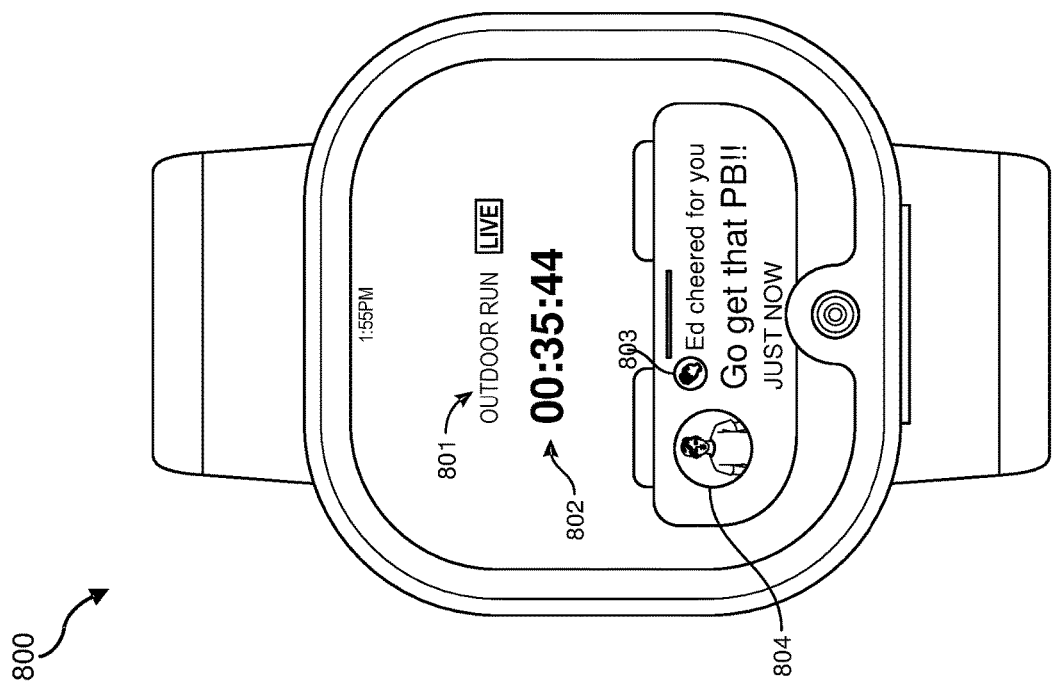
FIG. 8

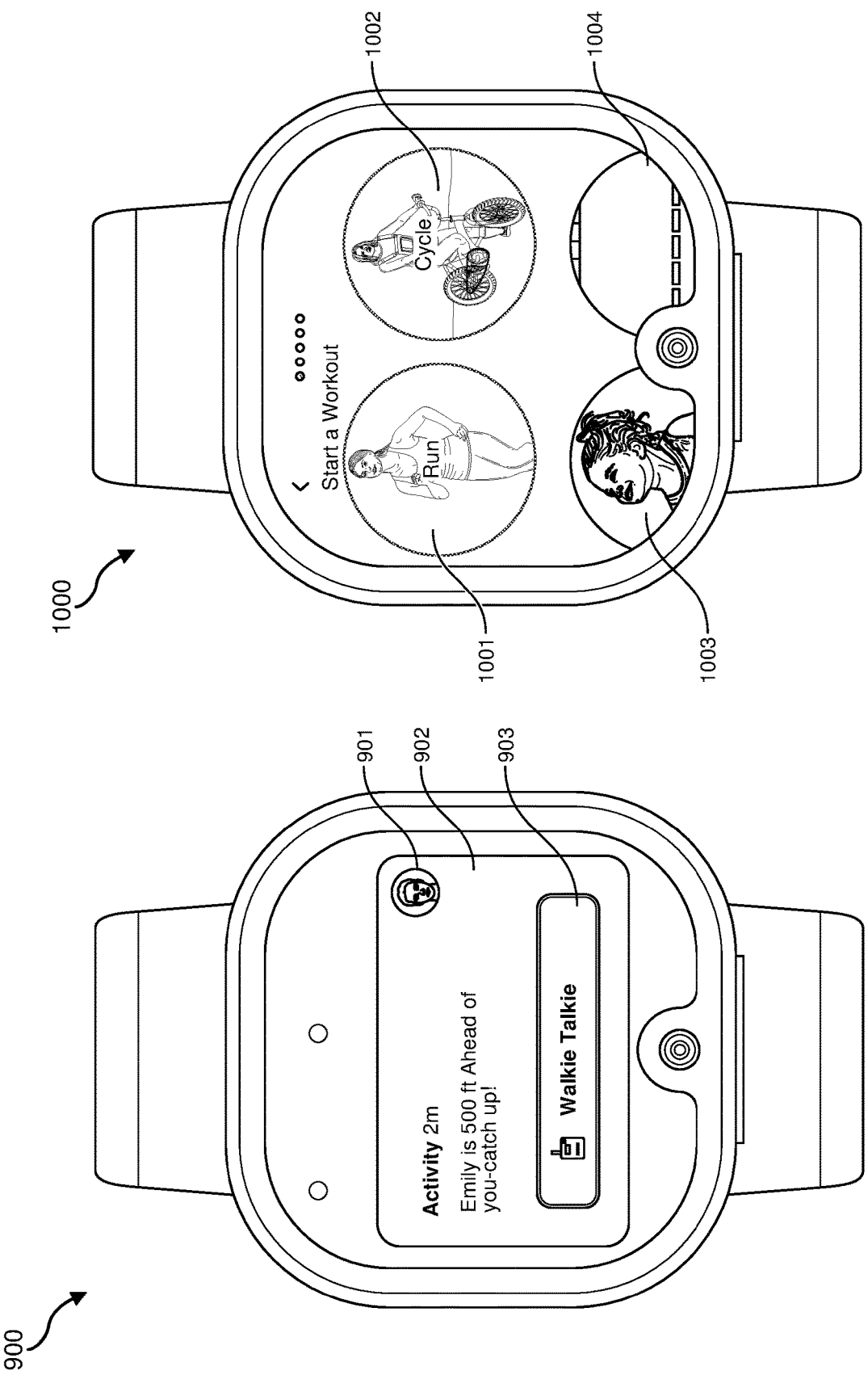

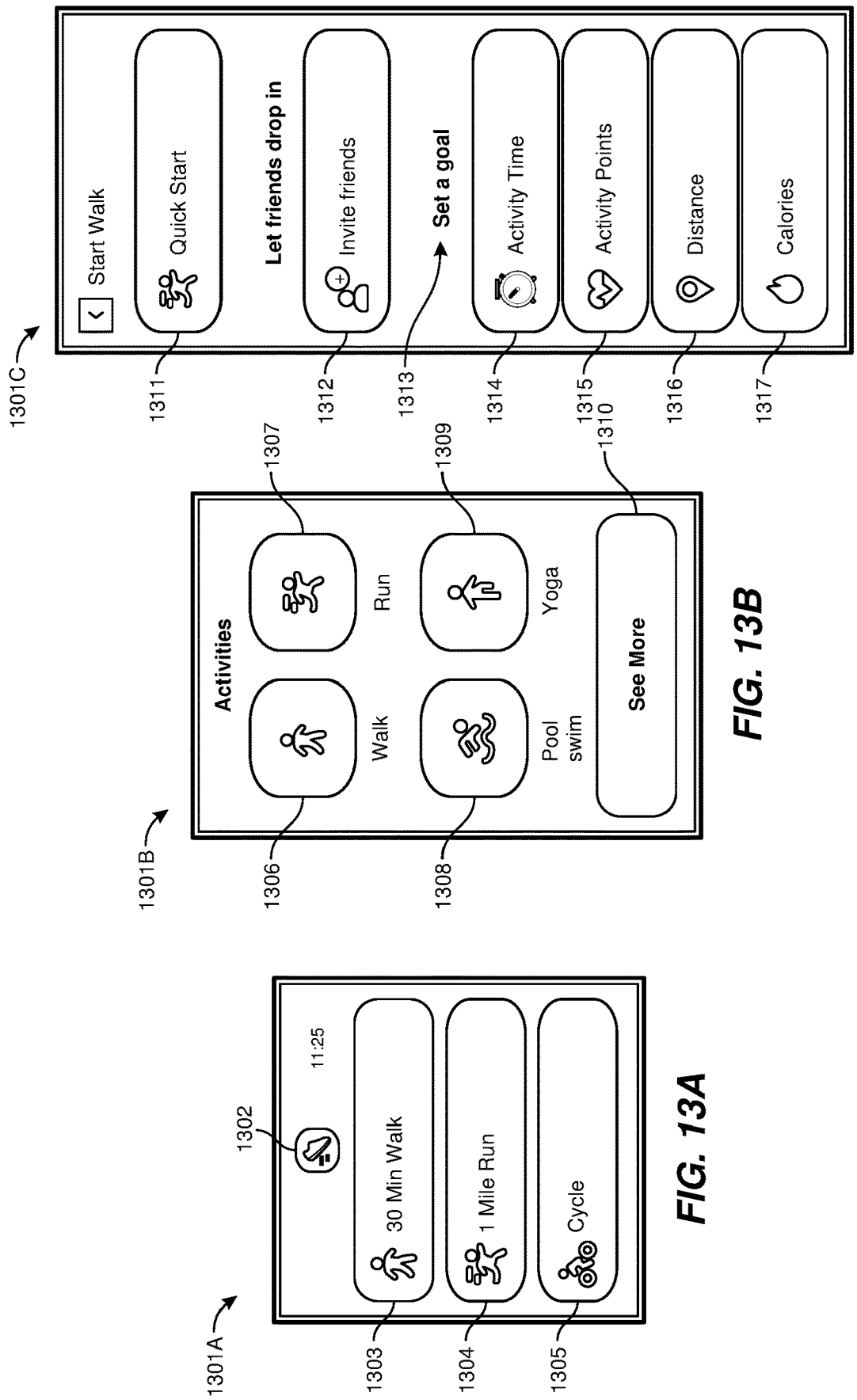

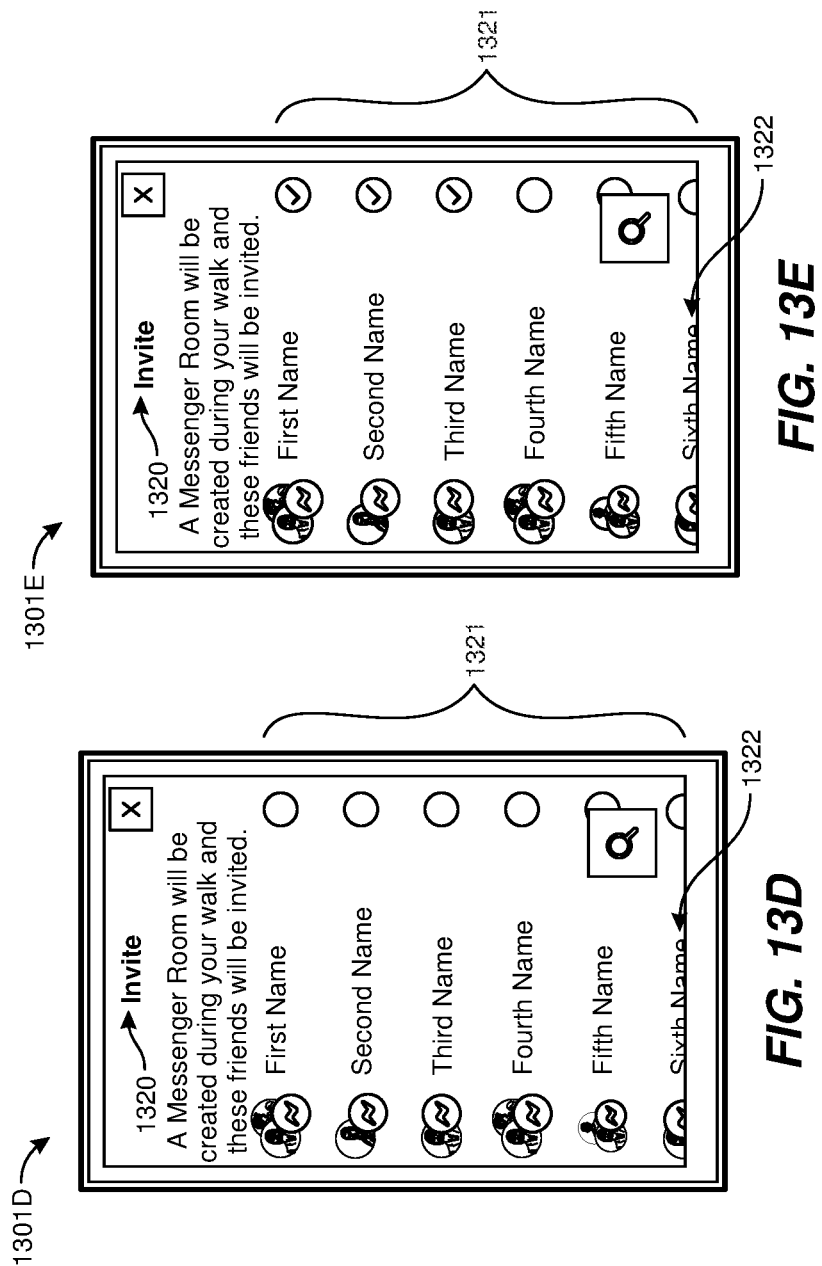

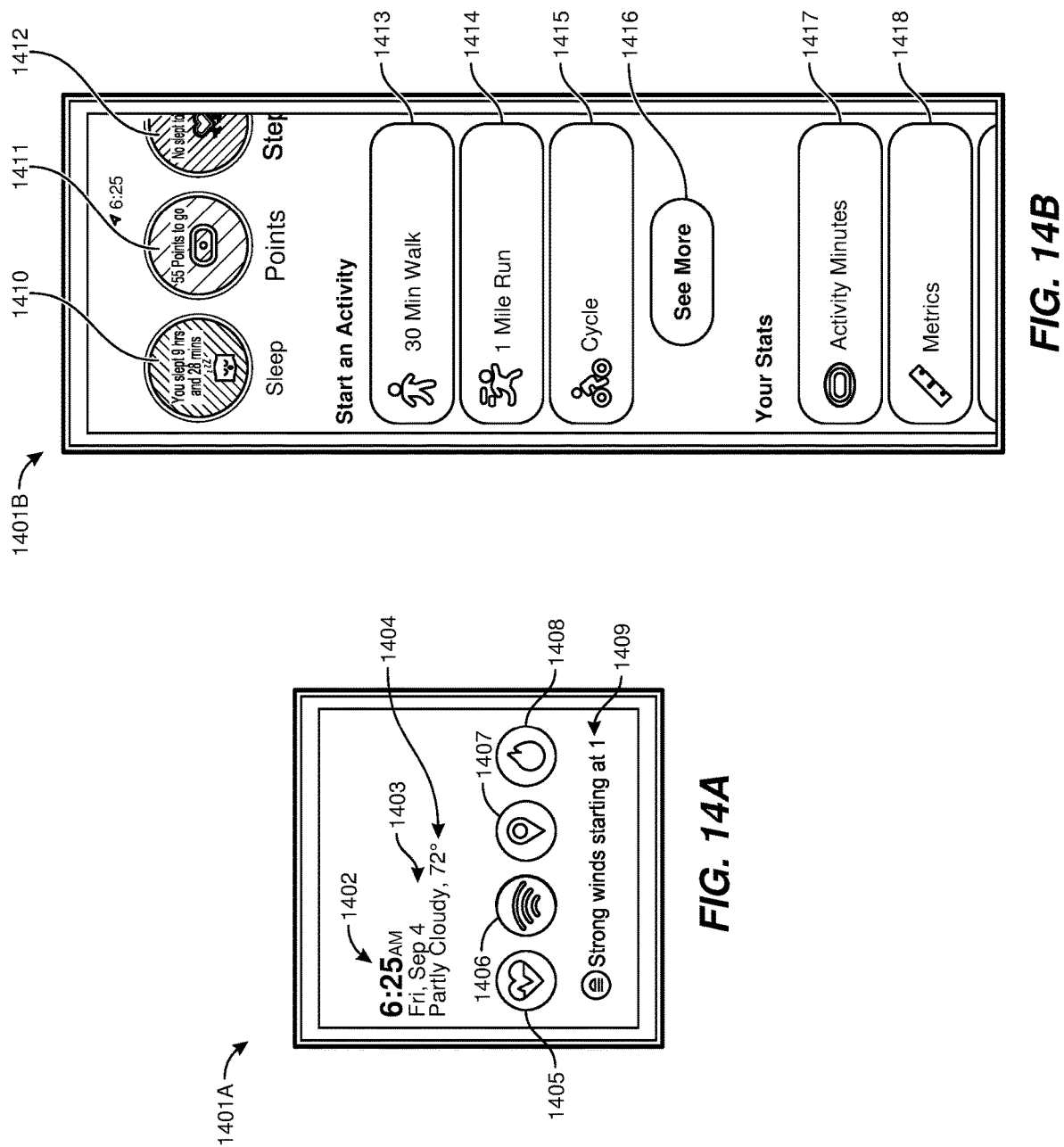

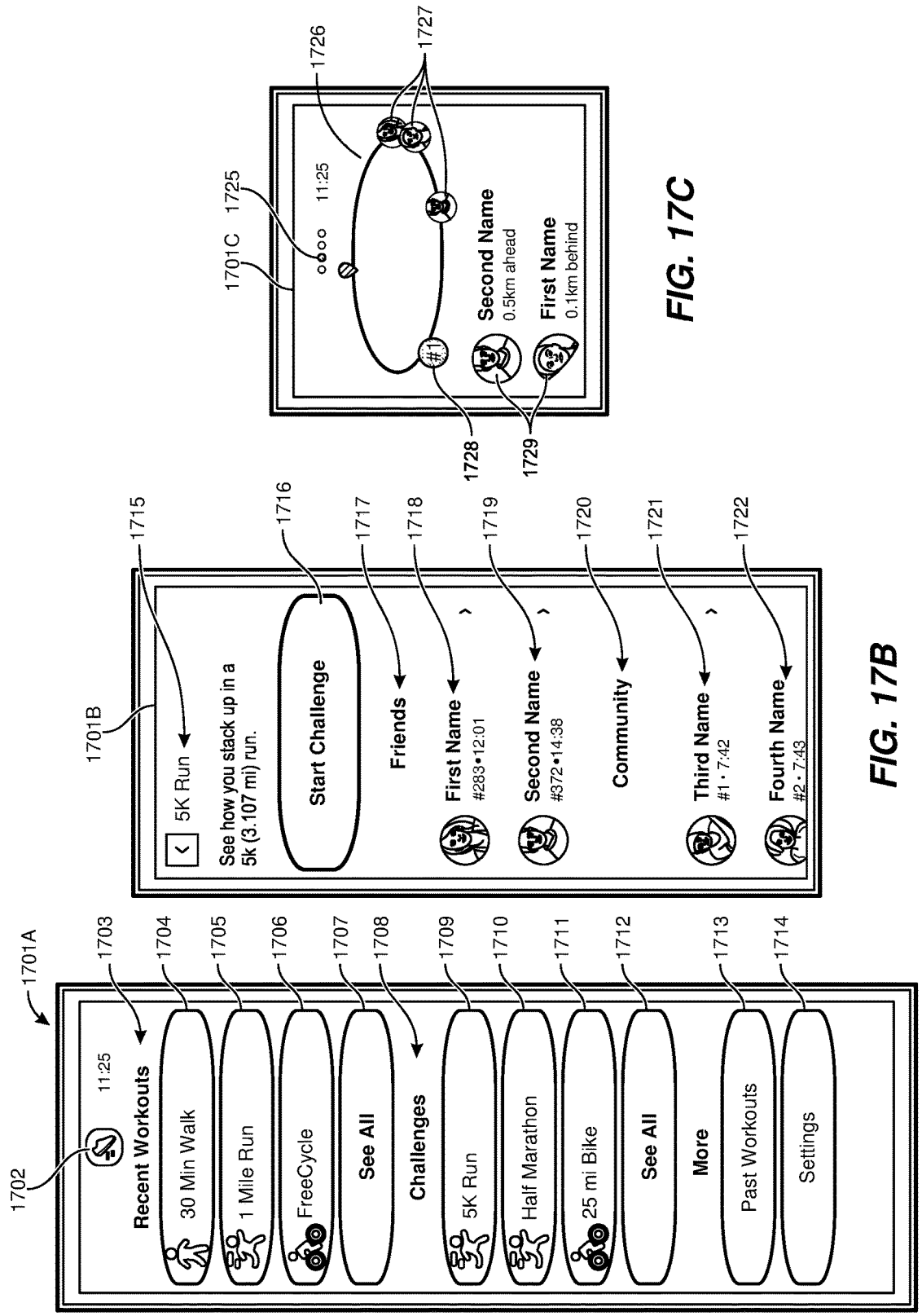

INTERFACES AND METHODS FOR REPRESENTING COORDINATED OBJECTIVES

CROSS-REFERENCE TO RELATED APPLICATIONS

This application claims priority to and the benefit of U.S. Provisional Application No. 63/132,246, filed on Dec. 30, 2020, which application is incorporated by reference herein in its entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 8 illustrates an embodiment of user interfaces on two different electronic devices in which show different aspects of live workouts.

FIG. 9 illustrates an embodiment of a user interface in which users may virtually train together.

FIG. 10 illustrates an embodiment of a user interface in which users may select individual, group, or virtual workouts.

FIGS. 13A-13F illustrate embodiments of user interfaces in which users are invited to an activity group.

FIGS. 14A-14D illustrate embodiments of user interfaces in which various information including group fitness objective information is presented.

FIGS. 17A-17E illustrate embodiments of user interfaces in which fitness challenges are promulgated and tracked.

Figure 1:
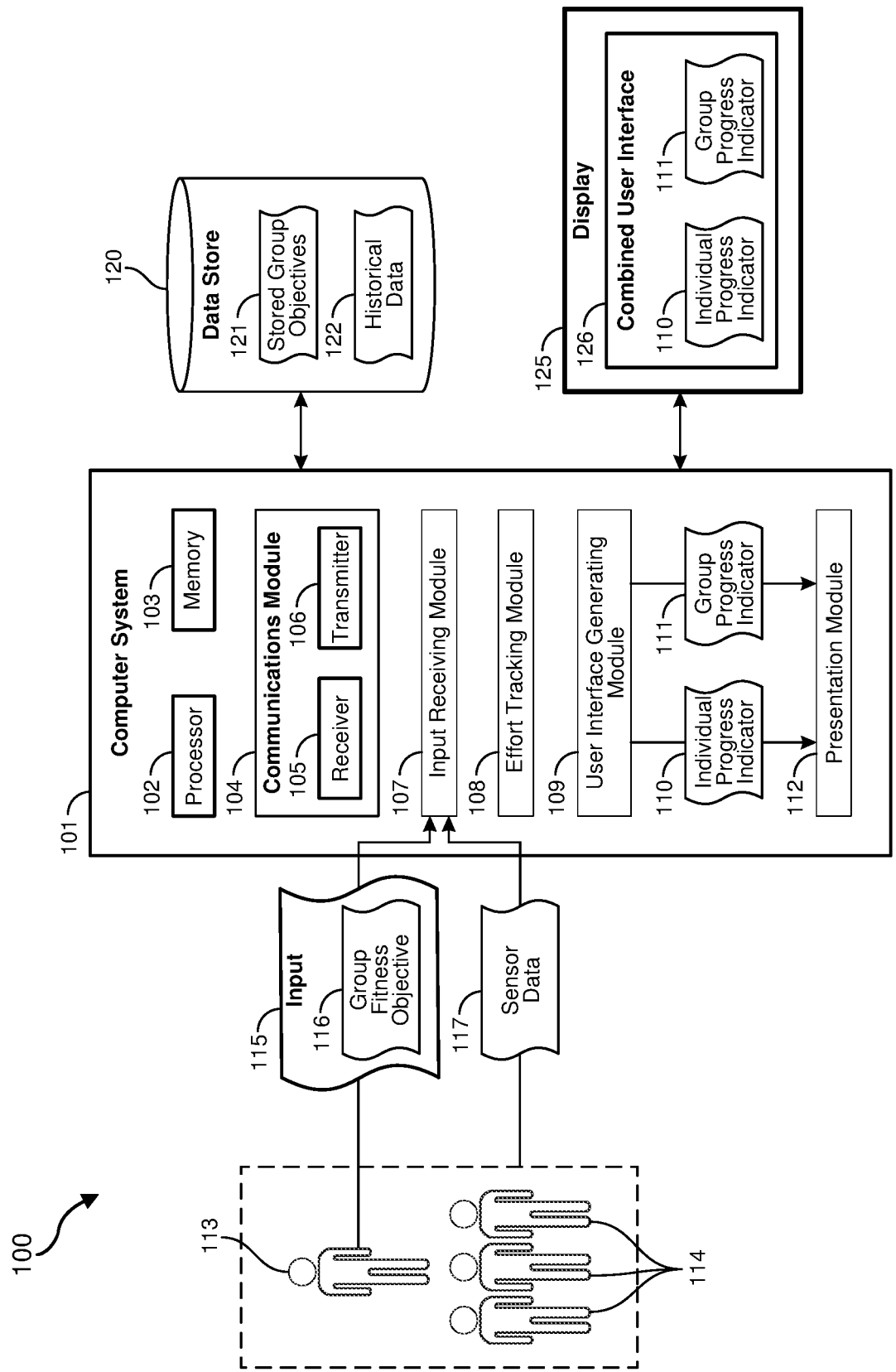
FIG. 1 illustrates a computing environment in which the embodiments described herein may be carried out.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Current smartwatches and other mobile electronic devices allow users to use and interact with a variety of different programs and applications. These applications may allow users to send text messages, make phone calls, set up calendar appointments, track the number of steps taken each day, and perform other similar tasks. In some cases, smartwatches may be used to track a user's fitness. For example, some traditional smartwatches may come equipped with heart rate monitors and global positioning system (GPS) radios. Using the heart rate monitor and GPS radio, a smartwatch application may report the user's heartrate during a workout, and may provide an indication of how far the user has walked or run, for example, based on GPS telemetry data. In some cases, these smartwatches may also be configured to track the number of steps taken by the user based on sensor inputs, for example, received from an accelerometer.

Smartwatch applications, however, are typically limited in the type of feedback and the type of interfaces they provide. For instance, traditional smartwatch applications tend to be highly personalized to the user. Accordingly, a user may be able to track their own workouts and see telemetry data from their own workouts, but may not have any way to view others' workouts. For example, if a user wanted to follow the workouts of a friend or family member, the user would need to access a smartphone or personal computer or tablet and then navigate to a webpage where the user might be able to view some of the friend or family member's workout data. This may be a cumbersome process that may dissuade people from taking an interest in other's fitness goals. Still further, traditional smartwatches and their associated applications do not allow users to set up group objectives and to work collectively toward those objectives. Rather, current smartwatch applications remain highly individualized, allowing users only to see their own fitness progress over time.

The embodiments described herein may provide a wearable device or other mobile electronic device that may be used to provide feedback regarding a group fitness objective that a user is taking part in and may also be used provide social support for an individual's fitness objectives provided by that individual's social network. For example, a user may be working out while wearing a wearable electronic device. The workout recorded by the wearable device may include walking, running, cycling, weightlifting, playing a sport, or any other type of workout. The wearable device may be configured to monitor the wearer's activity (e.g., using one or more of a plurality of different sensors including motion sensors, accelerometers, GPS radios, heart rate monitors, cameras, magnetometers, or other types of sensors) and may identify the user's efforts in relation to a group fitness objective. Additionally or alternatively, the wearer may perform activities and may receive social support during that activity from the user's friends, family, and/or from the public.

In some embodiments, for instance, a group of people (e.g., as part of a fitness class) may collectively decide on a group fitness objective (e.g., to work out at least 30 minutes each day). The wearable electronic device may then determine the user's efforts toward achieving that group fitness objective. The user interface of the wearable device may provide an indication of the user's individual efforts, along with potentially the efforts of other group users and the efforts of the group as a whole. In this manner, the wearable device may provide feedback regarding each user's progress toward achieving a group fitness objective. These concepts will be described with reference to the computing environment 100 of FIG. 1 and method 200 of FIG. 2 below.

FIG. 1 illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may also include program modules for performing a variety of different functions. The program modules may be hardware-based, software-based, or may include a combination of hardware and software. Each program module may use computing hardware and/or software to perform specified functions, including those described herein below.

For example, the communications module 104 may communicate with other computer systems. The communications module 104 may include wired or wireless communication means that receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may interact with databases, mobile computing devices (such as mobile phones or tablets), embedded or other types of computing systems.

The computer system 101 may also include an input receiving module 107. The input receiving module 107 may be configured to receive inputs from various users including an individual user 113 or a group of users 114. The group of users may include 114 substantially any number of users including the individual user 113 and at least one other user. Either or both of the individual user 113 and the group of users 114 may provide inputs including group fitness objectives 116 and sensor data 117. The group fitness objectives 116 may include substantially any type of achievement, goal, or other objective that is to be reached through the collective effort of two or more people. Thus, for example, the group of users 114 may set a group fitness objective 116 to run 50 miles within one week. Each individual user within that group (user 113 may, at least in some cases, be part of group 114) may agree to the group objective and may begin tracking their movements or, more specifically in this case, their runs. Accordingly, each user in the group of users 114 may track their individual runs to work toward the group goal of 50 miles. To track users' progress toward this group fitness objective 116, the input receiving module 107 may receive sensor data 117 from a variety of sensors including GPS sensors, heart rate sensors, accelerometers, and other types of sensors.

The effort tracking module 108 of computer system 101 may track each users' efforts toward achieving the group fitness objective 116. Throughout this process (which may be a multi-day, multi-month, or multi-year process), the effort tracking module 108 may be configured to track the group's efforts toward the group fitness objective 116. While the effort tracking module 108 is tracking the sensor data 117 and other inputs, the user interface generating module 109 may generate a combined user interface 126 that illustrates both the individual user's progress (e.g., via individual progress indicator 110) and the group's progress toward the group fitness objective 116 (e.g., via group progress indicator 111). The presentation module 112 may then present the generated combined user interface 126 on a display 125 (e.g., a computer monitor, a smartphone display, a smartwatch face, a tablet, a television, or other type of display). The individual progress indicator 110 presented on the display 125 may show how much the individual user 113, for example, is contributing toward the group fitness objective 116, while the group progress indicator 111 may illustrate the amount of progress the group 114 has made toward the group fitness objective 116. In some cases, these group fitness objectives 116 may be stored (e.g., 121) in a data store 120, and may be used as historical data 122 to compare current group fitness objectives to past group fitness objectives. These features are further explained in the flow of method 200 of FIG. 2 and the user interface examples of FIGS. 3A-12.

Figure 2:
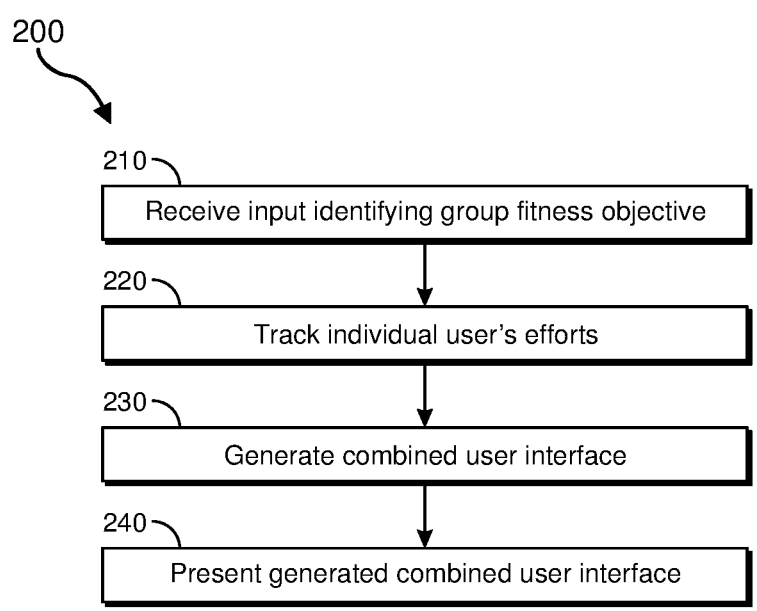
FIG. 2 illustrates a flow diagram of an exemplary method for generating a combined user interface.

FIG. 2 is a flow diagram of an exemplary computer-implemented method 200 for generating a combined user interface. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein (e.g., computer system 101) may receive at least one input identifying, for a group of users, a group fitness objective that is attainable through a combined effort of multiple individual users within the group of users. At step 220, the systems may track, via sensor data received from various hardware sensors, an individual user's efforts with respect to the identified group fitness objective. The systems may also, at step 230, generate a combined user interface that illustrates both an individual progress indicator illustrating the individual user's efforts with respect to the group fitness objective, and a group progress indicator illustrating the group of users' efforts with respect to the group fitness objective. The systems may then, at step 240, present the generated combined user interface on a display.

As noted above, a group fitness objective 116 may include substantially any goal, achievement, or objective that may be accomplished in different segments by individuals within a group. For example, one group fitness objective 116 may be to hike 10,000 vertical feet, or swim 25 miles, or bicycle 1,000 miles, or sustain a minimum specified heart rate for 500 minutes, or attend 50 group exercise classes, or perform 1500 minutes of yoga, or compete in 10 triathlon races, or run 20 marathons, or any other fitness-related objective. Within a given group fitness objective 116, each group member may contribute their own efforts toward achieving the group fitness objective. Thus, if a group establishes a fitness objective of 600 minutes of activity within a week (whether it is walking, running, hiking, swimming, weightlifting, cycling, etc.), each individual user's efforts with respect to the group fitness objective 116 may increment the group's progress toward the group fitness objective. The individual user's efforts and the group's efforts toward the group fitness objective 116 may be illustrated in a combined user interface that may be displayed on a wearable electronic device.

Figure 3B:
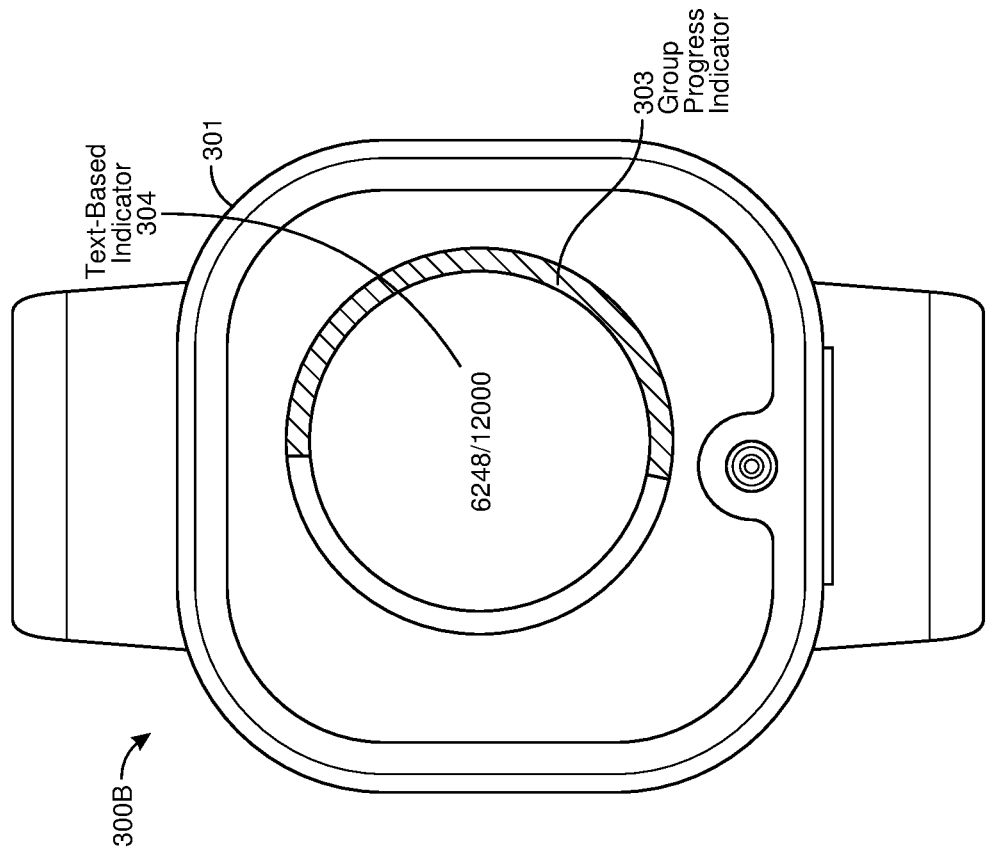
FIGS. 3A and 3B illustrate different embodiments of a combined user interface presented on a display.
Figure 3A:
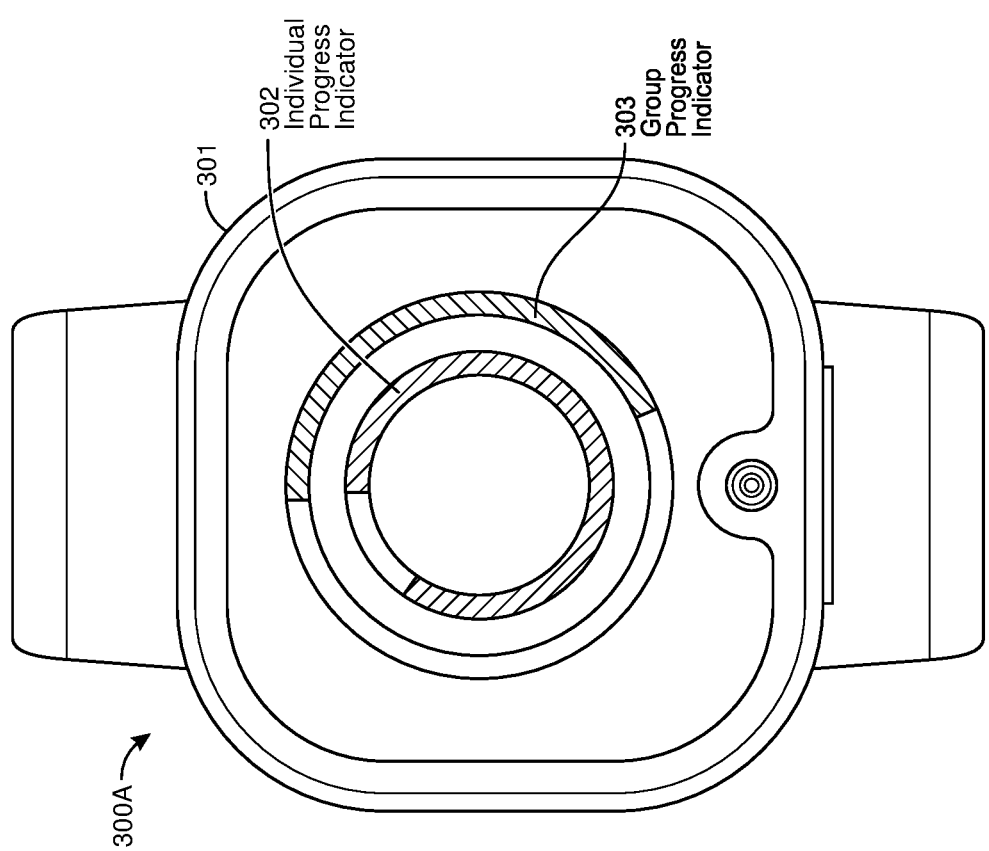

For example, FIG. 3A illustrates an embodiment of a combined user interface 300A displayed on an electronic device 301. The electronic device 301 may be substantially any type of electronic device including a smart watch, a smart phone, a laptop, a tablet, a personal computer, or other type of electronic device. For purposes of simplicity, the electronic device 301 will often be described herein as a smart watch or wearable electronic device, although it will be understood that these examples are not limiting. The electronic device 301 may include (or may be communicatively linked to) a display. In FIG. 3A, the display shows a combined user interface 300A having an individual progress indicator 302 and a group progress indicator 303. In some cases, the generated combined user interface 300A may include a double ring, where one of the double rings represents the individual user's efforts (e.g., individual progress indicator 302) with respect to the group fitness objective, and the other ring of the double ring represents the group's efforts (e.g., group progress indicator 303) with respect to the group fitness objective.

In some cases, a group fitness objective (e.g., 116 of FIG. 1) may be divided up into different portions, depending on the size of the group. Thus, for instance, if group 114 of FIG. 1 had 10 people, and the group selected a group fitness objective to run 100 miles, each individual user may be assigned an equal share of the objective (10 miles each in this case). Thus, in this example, the individual progress indicator 302 may illustrate how far the user has gone relative to their assigned 10-mile goal. The shading (or other type of indicator) may indicate, in a quickly ascertainable manner, that the individual user has run approximately 8.5 miles and is nearly complete with their individual portion of the group fitness objective 116. The group progress indicator 303 may illustrate how far the combined efforts of the group have incremented towards the group fitness objective 116. In this case, the shading indicates that the group has run approximately 45 miles out of the 100-mile goal. In some embodiments, the combined user interface 300A may be configured to show exact numbers for the individual and group progress indicators, while in other cases, rings or other designs may be shaded or colored to provide a relative indication of current progress.

For instance, as shown in the combined user interface 300B of FIG. 3B, a text-based indicator 304 may indicate that the group has achieved 6,248 minutes, for example, toward a group fitness objective of being active for 12,000 minutes. The group progress indicator 303 may be similar to or the same as the ring-shaped group progress indicator 303 of FIG. 3A and may indicate via shading or coloring how far the group has come relative to their group fitness objective 116. The text-based indicator 304 may provide a clearer indicator of exactly how far the group has progressed toward their group fitness objective 116. It will be understood that the graphical indicators and the text-based indicators may be presented in substantially any shape, size, color, ordering, wording, or configuration. Moreover, individual users may be able to configure and customize how the individual progress indicator 302, the group progress indicator 303, and/or the text-based indicator 304 are arranged and shown on the display of the electronic device 301. In some cases, the user may configure a different appearance for each group fitness objective 116 and, as such, each group fitness objective may have a different shape, coloring, background picture, method of incrementing the indicators, etc. According, users may be able to look at the user interface (e.g., 300A or 300B) and immediately know which group fitness objective 116 is being presented, simply based on the coloring, the layout, or other user-selected characteristics of the combined user interface.

Figure 4:
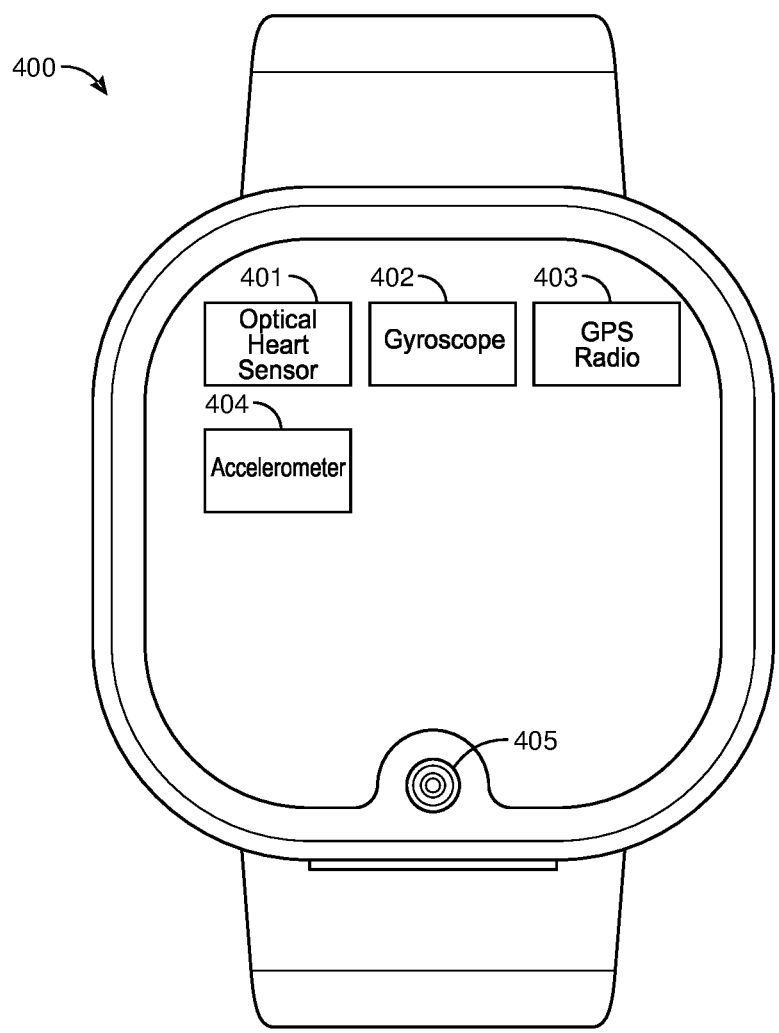
FIG. 4 illustrates an embodiment of a mobile electronic device having multiple different sensors.
Figure 6:
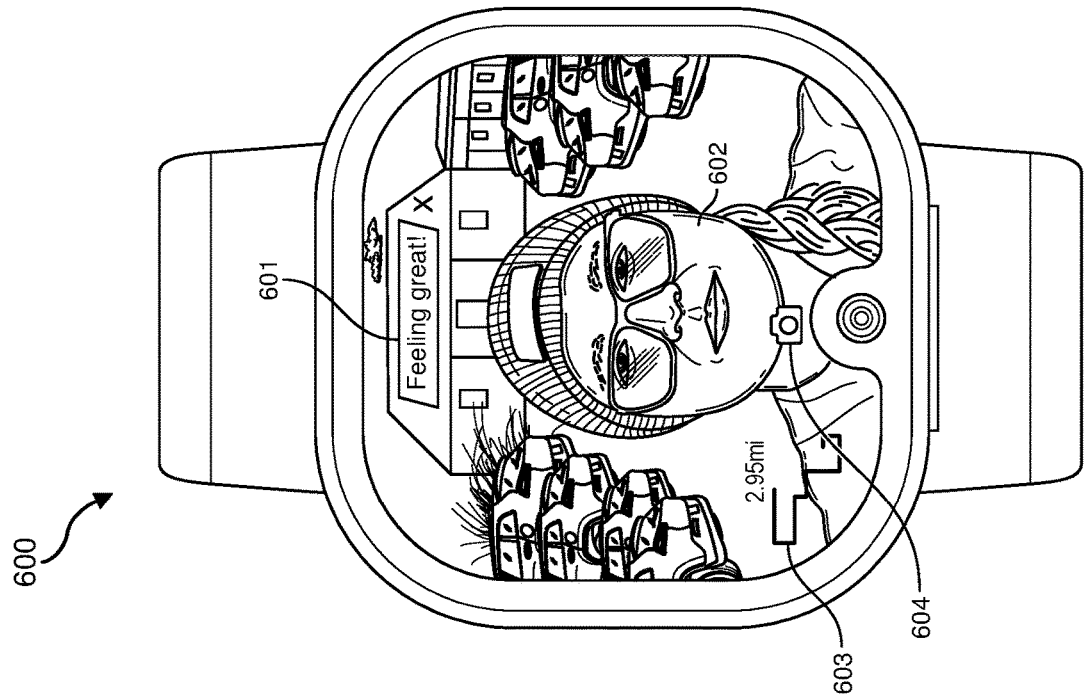
FIG. 6 illustrates an embodiment of a user interface that allows users to share activity stories.

The individual user's efforts toward these group fitness objectives 116 may be tracked using one or more sensors built into or communicatively linked to the electronic device 301. For example, as shown in FIG. 4, the electronic device 400 may include many different types of sensors including, but not limited to, an optical heart sensor 401, a gyroscope 402, a global positioning system (GPS) sensor 403, an accelerometer 404, and, at least in some embodiments, one or more additional user health sensors. Furthermore, the electronic device 400 may include a built-in camera 405 that may take pictures through a lens on the face of the electronic device or via a camera mounted on one or more of the sides of the electronic device.

The electrical heart sensor 401 of electronic device 400 may be configured to detect electrical impulse signals (e.g., electrocardiogram (ECG) signals) that cause a user's heart to beat. These electrical impulse signals may be measured via electrodes on a chest strap (that is, in turn, communicatively connected to the electronic device 400) or measured via electrodes embedded in the bottom of the electronic device.

The optical heart sensor 401 may be used to measure characteristics (e.g., frequency) of the user's heartbeats over time. The optical heart sensor 401 may use various methods including photoplethysmography (PPG) to measure heart rate. The optical heart sensor 401 may include one or more optical emitters (e.g., light emitting diodes (LEDs)) that emit light in the direction of the user's skin. In some cases, multiple different optical emitters and/or wavelengths of light may be emitted towards the user's skin. An optical detector that is part of the optical heart sensor 401 may be configured to detect the amount of light that is scattered by the flow of the user's blood through their body. Digital signal processing may then be applied to translate the detected amounts of scattered light into digital data that may indicate a current heart rate. The digital signal processing may also be configured to determine a maximum volume of oxygen or maximal oxygen uptake ($VO_2$), an amount of calories burned by the user, the amount of heart rate variability, a measure of blood metabolite concentrations, the user's current blood oxygen levels, the user's current blood pressure, and other health and fitness indicators. This digital signal processing may be performed by a special-purpose processor that may be designed specifically to interpret and convert detected light signals into discernable measurements and indicators.

The gyroscope 402 may be a standalone component or may be part of an inertial measurement unit having an accelerometer 404 and potentially a magnetometer. The gyroscope 402 and/or the accelerometer 404 may be configured to detect changes in motion, including changes in roll, pitch, or yaw. The gyroscope 402, the accelerometer 404, and/or a magnetometer may also be used to determine the user's current orientation, angular rate of change, and/or the user's current bearing (relative to magnetic north). In some cases, these components may be used to detect the user's movements in locations where GPS is unavailable or isn't working properly or adequately. The GPS radio 403 of the electronic device 400 may be configured to communicate with GPS satellites to determine the location of the electronic device 400 (and thus the location of the corresponding user). The GPS radio 403 may be used to determine the user's current location, pace, altitude, heading, and/or other measurements.

Accordingly, in this manner, many different sensors located directly on the electronic device 400 or communicatively connected to the electronic device may provide sensor data, alone or in combination with other sensors. Any or all of this sensor data may then be used to track a user's fitness efforts toward a shared group fitness objective.

Figure 5:
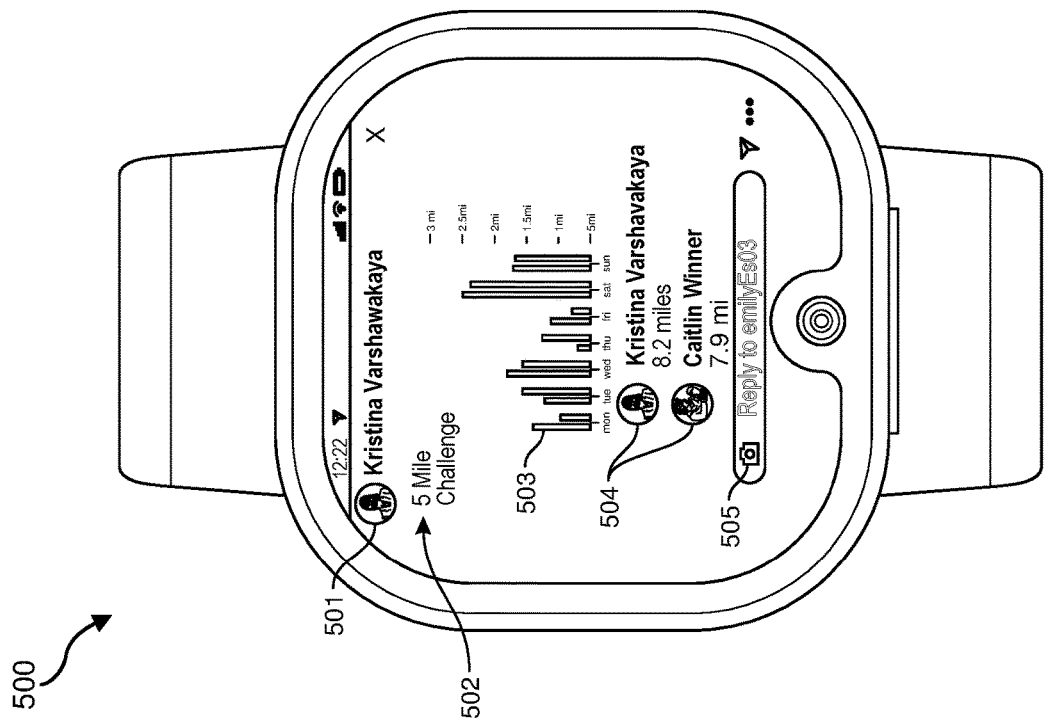
FIG. 5 illustrates an embodiment of a user interface in which a user participates in a group challenge.

In some cases, a user interface may be configured to present group challenges for a group of users. For example, FIG. 5 illustrates an embodiment in which a user interface 500 may illustrate one or more group challenges. For instance, a user, Kristina 501, may issue a group challenge 502 to a group of users (e.g., friends or family or members of an exercise class or running group). In this example, the group challenge 502 may be a 5-mile challenge that may challenge each user in the group to run at least five miles per day, or five miles on at least three days of the week, or some other variation as desired by Kristina, the challenge issuer. The chart 503 may illustrate how many people have completed the challenge on any given day (e.g., on the x-axis), and may show current progress toward that goal (e.g., on the y-axis). Other indicators 504 may show the current leaders, with Kristina having logged 8.2 miles and Caitlin having logged 7.9 miles. The indicators 504 may show a picture or avatar or other image or icon associated with a user. The chart 503 may be a bar chart, or may include progress rings (as in FIGS. 3A & 3B). In some cases, the interface may be a combined user interface that shows both the individual user's progress toward the group challenge 502, as well as the group's progress toward completing the group challenge 502. In some cases, the user interface 500 may also include an interactive element (e.g., 505) that allows users to take pictures using a built-in camera (e.g., 405 of FIG. 4). Those pictures may then be sent to the group and may be part of a story or collection of comments and pictures that the group makes in response to the group challenge 502. Such posts may also be shared to the individual user's own social graph if desired.

In some embodiments, a user interface may be configured to present user interface elements that facilitate integration with other applications. For example, the user interface 600 of FIG. 6 may integrate with applications that allow users to share stories, in some cases with a customized story format. Such stories may help users gain positive feedback and motivation through sharing their own fitness-related stories and reading the stories of others. In some embodiments, once a workout is complete, a story may be automatically generated for the user using sensor data or other elements selected by the user. For instance, user 602 may implement an application that allows her to post pictures of herself during or after her workout. She may also input text 601 that is displayed with the story. Furthermore, the user 602 may share a route outline 603 of their workout (e.g., a run or bike outline). In some cases, this route outline 603 may show the route taken during the run or bicycle ride, but may obscure the actual location. In some cases, the user 602 may take live pictures or video using a camera application 604. Some embodiments may allow the user to specify that a post or story with their selected workout data is to be posted automatically either upon completion of their workout or upon achieving a specific achievement such as winning a group challenge or meeting their individual portion of a group fitness objective. In that story, the user 602 may allow indications of their heart rate, distance, time, pace, or other data to be imported into and displayed in the story. The user 602 may have full control over which sensor or workout data is added to the story. Still further, the concepts discussed above as applied to the manual or automatic creation of a story may be applied to other types of social media posts including short-form videos (e.g., "reels"), text messages, short-form message broadcasts, blog posts, podcasts, or other types of social media posts.

Other applications accessible through the user interface 600 may include messaging applications that allows users to send messages to each other. In some cases, these messages may stay within a given fitness group of users. In other cases, the messages may be public. In still other cases, the messages may be sent and kept private between individual users. As such, users may use their electronic device to post stories, track fitness, and message other users, all through applications that are accessible through the user interface 600. Still further, other applications that may be accessible through the user interface 600 may include music playback applications. Such music playback applications may access music locally stored on the electronic device, or may stream music from internet-based music streaming platforms. In such cases, the user interface 600 may allow the user 602 to access their music or podcast playlists on streaming platforms directly through the user interface 600 without having to switch over to the streaming platform's application. Accordingly, users may perform many different functions from other applications directly through the user interface 600.

Figure 7:
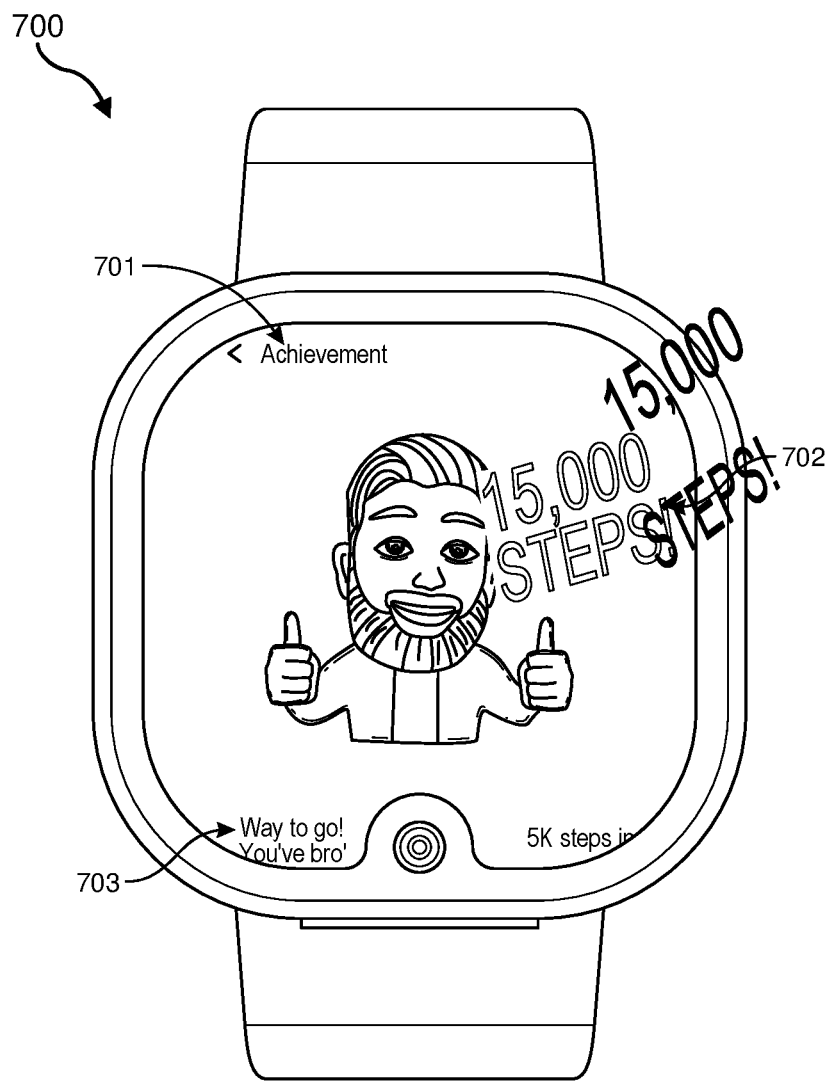
FIG. 7 illustrates an embodiment of a user interface of a shareable badge sent to a user.

FIG. 7 illustrates an embodiment of an example user interface 700 in which a user may send shareable badges to other users or may receive shareable badges from other users. For instance, a user may receive or share the shareable badge 702 showing that a user has achieved 15,000 steps. This shareable badge 702 may be static or animated, and may be customized to include any number of units (e.g., steps, miles, laps, etc.) and substantially any image, sticker, icon, or other displayable badge. In some cases, the shareable badge 702 may indicate that a certain achievement 701 has been reached by the user. For example, if a user won a group challenge, or contributed the most individual effort to a group fitness objective, won a one-one-one challenge with a friend, or completed a streak of five consecutive days of working out, other users may craft and share a badge highlighting the accomplishment. Other users may also provide encouraging notes (e.g., 703), thumbs ups, or other text that may be shown on the user interface 700. These shareable badges 702 may be ephemeral and, as such, may be shown for a specific amount of time (e.g., five seconds), and then may automatically disappear. In other cases, the shareable badges may be retained on the user interface 700 until cleared by the user. Users may also respond to receiving a shareable badge by sharing a badge back with the sending user. Users may also respond to receiving shareable badges by posting those badges on their stories, or by posting the badges to a "wall of fame" that shows off the badges the user has received over time.

In some embodiments, users may be able to broadcast live workouts. As shown in FIG. 8, a user interface 800 may illustrate that the user is currently performing a workout. The indicator 801 may show that the user is currently running outdoors. Element 802 may indicate how long the user has been running. While the user is performing their live workout, other users may send encouragement and cheers to the user. For instance, user 804 may send a hands clapping emoji 803 along with text and/or other images or icons congratulating the user on their workout and providing reactions or comments. In some cases, live metrics associated the user (e.g., from any of the sensors 401-404 of electronic device 400 of FIG. 4) may be illustrated in the user interface. In some cases, these metrics may be shown in the user interface 800 of the electronic device, while in other cases, the metrics 811 may be shown in the user interface of an associated phone, tablet, or other computing device. The metrics 811 may indicate that the user is actively working out, and may provide information on duration, heart rate, distance, pace, or other information. Indicator 810 may identify the person performing the live workout, and indicators 813 may indicate reactions and comments of friends, family, or other users. Indicator 812 may indicate which song the user is currently listening to. Any or all of this live workout information may be shared with other users in a story or post using UI element 814. In this manner, users may perform live workouts and may see the interactions provided by other users. Such interactions may motivate the user to complete their own fitness objectives or work harder toward a group fitness objective.

In some embodiments, as shown in FIG. 9, a user interface 900 may include a virtual workout companion. A virtual workout companion may be another person, whether real or virtual, that aims to help an individual user perform at their highest level. The virtual workout companion may provide real-time workout metrics from other users, may provide indications of where those users are located, or other information or encouragement to motivate the user. For example, user 901 may be out on a run. A virtual workout companion may be provided via interface 902 indicating that a friend or other user has run that same route at a previous time. The interface 902 may indicate that the virtual workout companion is "running" and is 500 feet ahead. The virtual workout companion may not actually be currently running, but may be a "ghost" or recreation of a runner that previously ran that route (e.g., a friend of the user). As such, the virtual workout companion may be said to be virtually running the same route at the same time as the user 901. In cases where another user is actually out on a run (or performing some other activity) at that time, the real-time workout metrics of that other person may be available to the user, and the user interface 900 may provide walkie talkie 903 or other communication functions that allow the users to converse. The users may banter with each other or provide encouraging words to catch up or to power ahead.

In some cases, the virtual workout companion may provide visual or audible indications of the user's individual efforts toward a group fitness objective. The user 901 may have control over parameters and settings associated with the virtual workout companion, allowing the virtual workout companion to perform functions such as displaying other user's metrics, initiating walkie talkie, messaging, or other types of communication, or performing similar functions. In cases where the user 901 wishes to see the workout metrics of other users, those metrics may represent live, real-time data, or may include historical data. Thus, for example, the metrics may be based on live sensor data (e.g., 117 in FIG. 1) or may be based on stored historical data 122. The virtual workout companion may also be integrated into virtual or physical fitness classes (e.g., classes led by a virtual or in-person trainer). The virtual workout companion may present statistics or metrics from other users in the class, upon receiving sharing approval from those users. In cases where the virtual workout companion represents a fitness coach, nutritionist, or personal trainer, the professional may provide individualized targets, challenges, or other objectives for the user to achieve.

Figure 11:
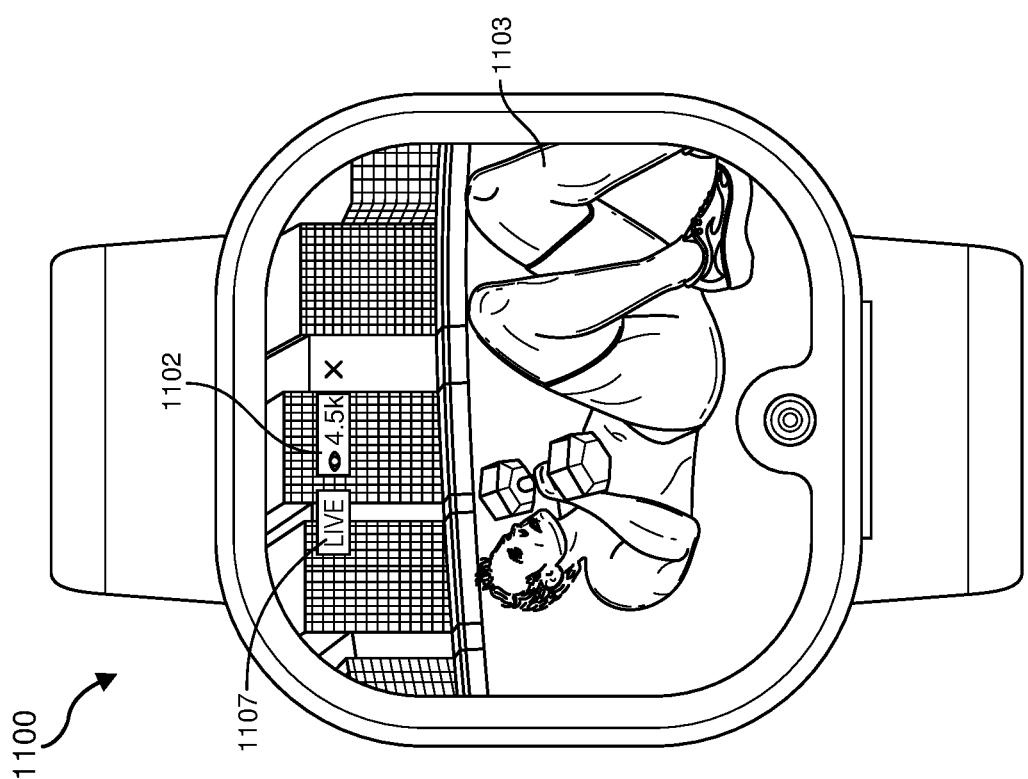
FIG. 11 illustrates an embodiment of a user interface presented during a physical or virtual class.
Figure 13F:
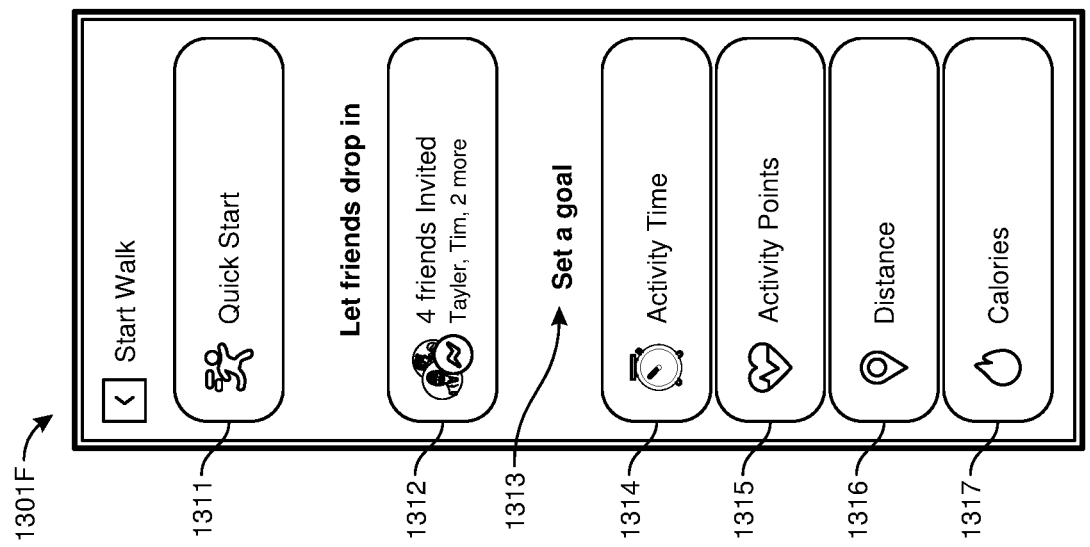

Thus, for example, as shown in FIG. 10, a user interface 1000 may allow a user to select an activity (e.g., 1001-1004) such as running, cycling, yoga, etc. and start the workout. The fitness professional may then provide input as a virtual workout companion, setting goals, offering pointers or tips, or providing encouragement. The virtual workout companion may, at least in some cases, follow the user throughout their workout and may provide an example to follow. For instance, as shown in FIG. 11, the user interface 1100 may show a user 1103 (e.g., a fitness coach) performing a live workout 1107. An indicator 1102 may show how many users are watching or are participating in virtual or in-person classes led by the user 1103. Thus, whether a user is working out in real-time, along with the class and fitness coach, or is participating asynchronously, the virtual workout companion may provide visual, audible, textual, or other information to assist the user in their workout. Still further, the virtual workout companion may present fitness challenges and may display the results of competitions and challenges in the user interface. These challenges and results may be presented alongside with shareable badges or other icons or emojis. Still further, the virtual workout companion may provide social integrations that allow the user to seamlessly post or share their workout data to their social media feed or other social graphs.

Figure 12:
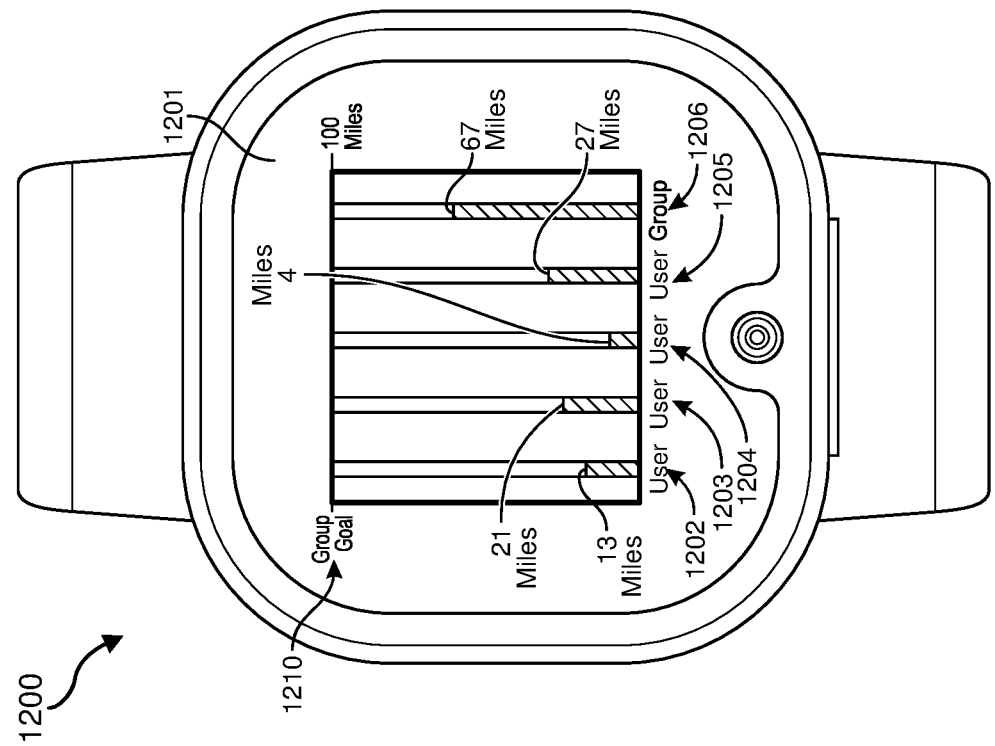
FIG. 12 illustrates an embodiment of a user interface in which multiple individual users' progress is shown toward a group fitness objective.

FIG. 12 illustrates an embodiment in which a user interface 1200 may be configured to present multiple different users' efforts with respect to an identified group fitness objective. These users' efforts may be displayed alone or in addition to the original user's individual progress indicator and the associated group's progress indicator. For example, a first, original user 1202 may be the user wearing the mobile electronic device 1201. The user may be part of a group 1206, and that group may have multiple different individual users (e.g., 1203, 1204, and 1205). It will be understood that the group 1206 may have substantially any number of users (including virtual users), and that not all users may be shown in the user interface 1200. In some cases, the original user 1202 may select specific users within the group 1206 to view their efforts relative to the group fitness objective 1210. Thus, for instance, in the user interface 1200, the group fitness objective was set at 100 miles, as indicated on the y-axis. The original user's progress is shown as 13 miles, selected user 1203's progress is shown as 21 miles, selected user 1204's progress is shown at four miles, selected user 1205's progress is shown at 27 miles, and the group's progress is shown to currently be at 67 miles (i.e., the total sum of the original user and the four selected users' efforts). In cases where the group includes other users that are not selected users, the group total may be higher than the sum of the original user and the selected users' efforts.

While the user interface 1200 shows the users simply listed as "User," it will be recognized that each user spot may have a name, an image, an avatar, an icon, or other image or text that represents that user. Thus, at a glance, the original user 1202 may be able to look at a group fitness objective and see where their own individual efforts are relative to the group, as well as the efforts of other selected group members. In some cases, the original user 1202 may be able to add or remove users from their selected users and, in such cases, existing graphs and data for removed users may be taken off of the user interface 1200, and new graphs, rings, text, or other progress indicators may be dynamically added to the user interface 1200 to track those selected users' efforts relative to the group fitness objective 1210. In some cases, the user interface 1200 may also provide interactive UI elements that allow users to challenge specific users or all group users to challenges or competitions. In such cases, competition results may be automatically posted to a social media feed or other social graph associated with the original user 1202 and/or associated with the group of users in group 1206.

FIGS. 13A-13F illustrate embodiments of user interfaces in which various users are invited to an activity group. An activity group may be a group of one or more users that join in a common activity. The activity may be performed synchronously, where each of the group members runs, walks, hikes, cycles, etc. together, or may be performed asynchronously, where one or more of the group members performs the activity at a different time, but in the context of the group. For instance, whether performing the activity together or at separate times, each group member's activity data may be shared with the other group members. This activity data may include an indication of when the user performed the activity, where they performed the activity, how long the activity took, the amount of elevation gained or lost during the activity, average pace, average heart rate, amount of energy expended, or other activity data. This data may then be shared to other members of the group who can then see how others fared when performing the activity.

FIG. 13A provides a user interface 1301A that may allow a user to begin an activity. The user interface 1301A may be provided on a smart watch display, on a mobile phone display, on a tablet or laptop display, or on some other type of display. Although the user interface 1301A is shown as generally square, it will be recognized that this UI (and any other of the UIs described herein) may be circular in shape, rectangular, square with rounded edges (squircle), or may have some other shape. The user interface 1301A may present various activity options including, for example, an option for a timed 30-minute walk (e.g., 1303), a one-mile run (1304), or a cycling session (1305). Selecting any of these buttons may begin the associated activity. Of course, other activity options may be presented on the user interface 1301A, including swimming, weightlifting, hiking, cross fit, high-intensity interval training, yoga, or other activities. These activities may be selected and customized by the end user. A customizable icon 1302 may be displayed to hint at which types of activities are available through the user interface 1301A.

The user interface 1301B may show additional activities that may be performed individually or as a group. The activities illustrated may include walking 1306, running 1307, swimming 1308, and yoga 1309, along with potentially other activities available using UI element 1310. In some cases, a challenge to perform a given activity may be issued by a user to that user's friends, family, or associates. In such cases, a user may select specific members of a group and may issue a challenge to those users. The challenge may be competitive in nature, or collaborative in nature. In competitive challenges, each user is pitted against the efforts of the other users in the group. In collaborative challenges, a common fitness goal or objective may be set, and each user may work toward achieving that common goal of, for example, 100 miles walked among the group. As noted above, the user interfaces herein may be configured to show both the user's individual progress toward the common goal, as well as the group's collective progress toward the common fitness objective.

Figure 19:
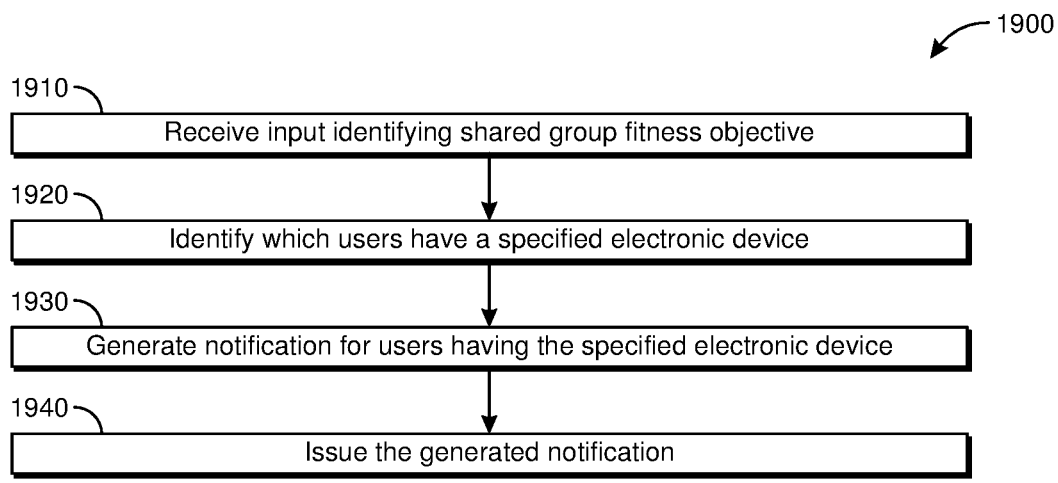
FIG. 19 illustrates a flow diagram of an exemplary method for performing a device-related challenge.

In some cases, a group challenge may be issued to users of a specific device, or users of a specific software application. For instance, as shown in the method flow 1900 of FIG. 19, one such method may include, at step 1910, receiving at least one input identifying, for a group of users, a shared group fitness objective that is attainable through a combined effort of multiple individual users within the group of users. The Method 1900 may then include, at step 1920, identifying which users of the group of users have a specified electronic device or use a specified software application (e.g., users that use a specified smart watch or people that use a specified fitness app). Then, at step 1930, the Method 1900 may include generating a notification for those users that have the specified electronic device type (or that use the specified software application) and, at step 1940, may include issuing the generated notification to those users that have the specified electronic device type (or use the specified software application). This notification may include the shared group fitness objective.

Thus, for instance, if an entity wanted to issue a challenge (e.g., a challenge to do a one-mile run, as provided by UI element 1304 in user interface 1301A), that entity may specify which devices or which device types are to receive the challenge. The underlying system may then generate the challenge and transmit or otherwise issue the challenge to each electronic device of that specified type (e.g., a specific smartwatch or a specific version of a smartwatch). In some cases, the challenge may only be issued to electronic devices whose users have opted in to receive such challenges. Similarly, a software application publisher may create and issue a group challenge (either collaborative or competitive) to users of a specific software application (e.g., a fitness-related application). Users that receive the challenge may thus participate in the activities associated with that challenge, and their efforts toward the common goal of the challenge may be tracked and posted to the members of the group. In this manner, device manufacturers or software application producers may issue broad group challenges to some or all of the users of their devices or software applications. As such, these users may participate together in specific challenges and work toward a common goal.

Figure 20:
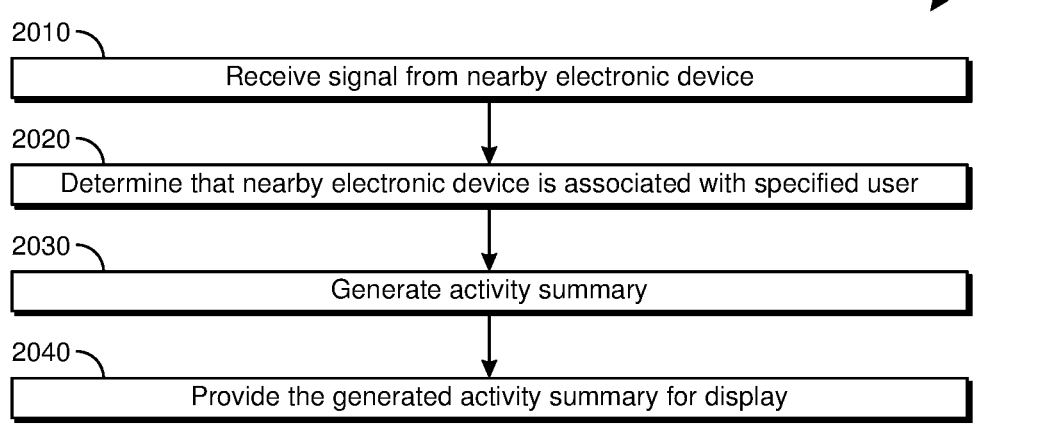
FIG. 20 illustrates a flow diagram of an exemplary method for detecting which other users are taking part in an activity.

In some cases, a user may be performing an activity by themselves, such as a 30-minute walk initiated using button 1303 of user interface 1301A. In such cases, the user may be available to chat to other users including friends or members of a group. In at least some of the embodiments herein, an underlying electronic device (e.g., a smart watch) may automatically create a group chat (or other form of interactive communication) simply by beginning an activity. For instance, as shown in the method flow 2000 of FIG. 20, a method for automatically creating a group chat or other type of group interaction may include, at step 2010, determining that a user has begun performing an activity. Then, at step 2020, upon determining that the user has begun performing the activity, the Method 2000 may include automatically creating a group chat or another type of interactive communication platform. Such an interactive communication platform may include a video chatroom, an audio chatroom, a text-based chatroom, a group phone call, a group video call, or other similar communication means. The automatically generated interactive communication platform may allow for synchronous or asynchronous communication with other members of the group. At step 2030, the Method 2000 may further include receiving, at the automatically generated interactive communication platform, one or more communications from the other users and, at step 2040, may include presenting the received communications within the automatically created interactive communication platform.

Thus, for example, a user may begin a walk using button 1306 of user interface 1301B. The underlying electronic device may then automatically create a video chatroom, for example, and may issue invitations to group members join the video chatroom. The invitations may notify other users of a group or other selected users that the user is out on a walk and is available to video chat. Accordingly, if desired, other users may join the video chat and chat or otherwise interact with the user. The other users may begin performing the activity (e.g., walking) as well, or may simply chat with the user while that user is performing their selected activity. In some cases, once the user has finished their activity, the chatroom may be automatically closed, or may be closed earlier at the behest of the initial user. In some cases, a user may be able to select which activities trigger automatic creation of communication platforms (e.g., walking, hiking, or running), and may further be able to select which types of communication platforms are automatically created when they perform the specified activity. Still further, the user may be able to specify certain dates or times of the week when communications platforms should or should not be automatically instantiated upon beginning an activity. Thus, a user may have full control over when and which interactive communication platforms are created as the result of performing an activity.

Within these automatically created interactive communication platforms, users may invite other users to join a given chat session or group phone call. For instance, as shown in FIG. 13C, an interactive element 1312 may be provided in a user interface 1301C that, when selected, may present a user interface 1301D that allows the user to invite (1320) other people 1321. In some cases, the user may invite other people individually (1321) or may invite another group of people (1322). User interface 1301E indicates that three of the displayed individuals have been invited 1320, as indicted by the check marks. These selected individuals may receive invitation notifications, indicating that they are invited to join a communication platform (e.g., a video chat) that may have been created automatically simply by the user beginning a hike or other activity. The user interface 1301C of FIG. 13C may also allow the user to set goals 1313 for the activity, including time-based goals (e.g., minute- or hour-based goals) (1314), activity point-based goals (1315), distance-based goals (1316), and/or calorie-based goals (1317). These goals may apply to just the user who started the interactive communication platform (or whose activity automatically started the communication platform), or may apply to others that were invited into the group (e.g., as shown in element 1312 of user interface 1301F). In some cases, users may have previously set goals or invited friends, and may simply select a "quick start" button 1311. In such cases, those goals may be automatically applied and those friends may be automatically invited to the "quick-started" activity. Accordingly, whether a group communication platform is generated deliberately or automatically upon beginning an activity, users may be able to invite others to join along in that activity, whether at the same time or at a later time.

FIGS. 14A-14D illustrate embodiments of user interfaces in which various information including group fitness objective information may be presented. These user interfaces may be dynamic and may be updated to show different information over time. For instance, user interface 1401A of FIG. 14A may show a current time 1402, a current date 1403, current weather conditions 1404, and a weather forecast 1409. The user interface 1401A may also include various indicators including a heart rate indicator 1405, a wireless connection indicator 1406 (e.g., cellular, GPS, WiFi, or other signal strength indicator), a location identifier 1407, a calories burned indicator 1408, or other workout-related indicators. The user interface 1401A may be an initial user interface that is displayed when the underlying electronic device is in a default mode or setting. When the user interacts with the UI 1401A, the user interface 1401B of FIG. 14B may be displayed.

The user interface 1401B may display various updateable indicators including a sleep indicator 1410 that indicates how long the user slept on the previous night, an activity points indicator 1411 indicating how many activity points the user has earned that day, a step counter 1412 indicating how many steps the user has taken that day, or an activity time indicator indicating how many minutes the user was active that day 1417. The user interface 1401B may also provide interactive elements to select a 30-min walk (1413), for example, or a one-mile run (1414), a quick cycling session (1415), or other quick-start activities (1416). Other interactive elements may allow the user to view their activity minutes 1417 and/or other metrics 1418 associated with their workouts or their general wellbeing. In some cases, for instance, the underlying electronic device (e.g., a smart watch) may be configured to track the user's sleep over time, or may track the amount of time spent meditating, or doing yoga, or performing other activities that improve mindfulness or emotional wellbeing. In some cases, this information may be shared with selected individuals, while in other cases, this type of information may be kept private.

Figure 14D:
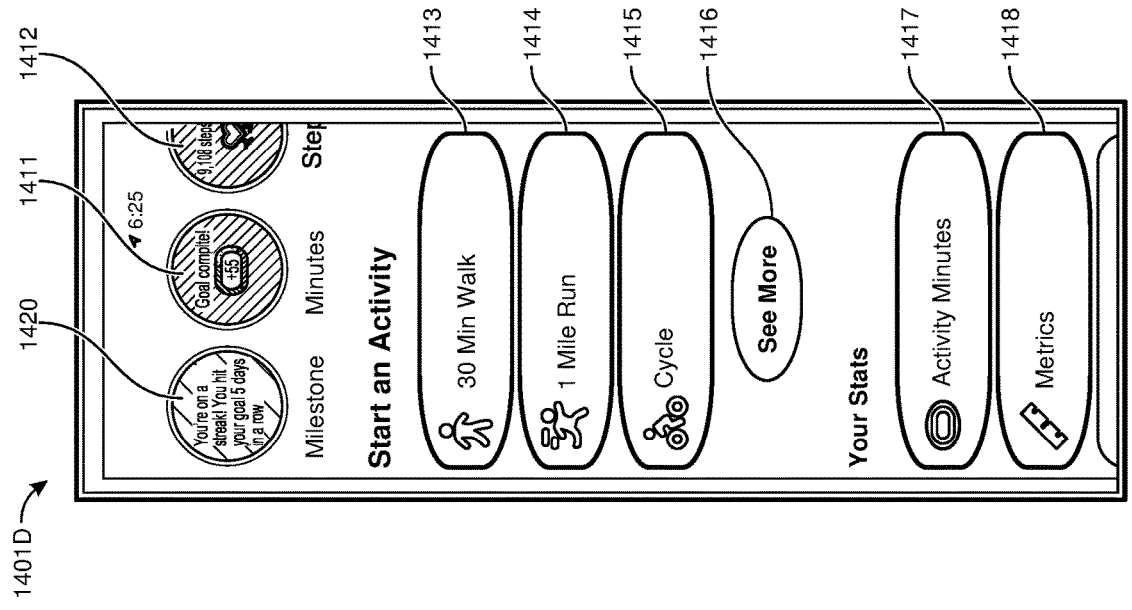
Figure 14C:
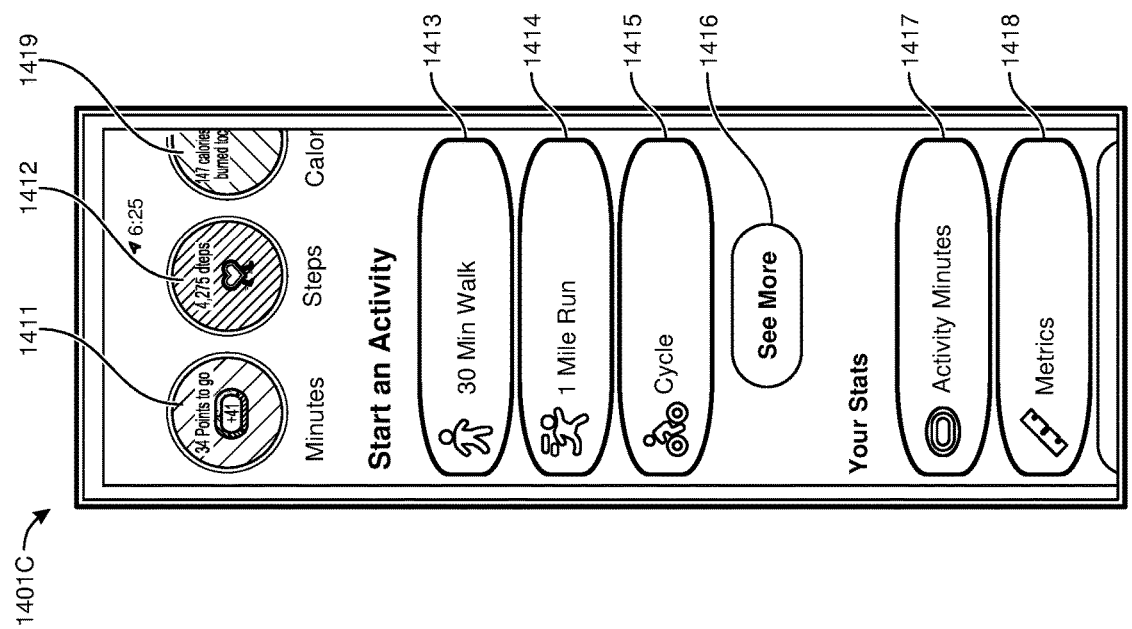

As shown in user interface 1401C of FIG. 14C, the activity minutes indicator 1411 may be updated to show that the user has accrued 41 activity minutes and has 34 minutes left to go to achieve their daily or weekly goal. The steps indicator 1412 may also be updated to show that the user has now taken over 4,000 steps. Still further, a new indicator 1419 may be shown that indicates how many calories the user has burned in a given day or during a given activity. When a user has hit a specific milestone (e.g., working out five days in a row), a milestone indicator 1420 may be displayed, as shown in user interface 1401D of FIG. 14D. These milestones, minutes, steps, calories burned, and other indicators may be kept private to the user, or may be shared with other users (e.g., users that are part of a collective group challenge). Thus, at least in some cases, other users in a group may see that the user has hit a given milestone, or has achieved a certain number of activity minutes. These other group users may then send congratulatory messages or stickers, as described above in FIG. 7. These UI indicators may also be configured to show the results of direct challenges or group challenges, and may show the user's individual progress in those challenges as well as the user's contribution toward the group's fitness goals. In some cases, these indicators may be configurable by the user to show those pieces of activity or wellbeing data that the user is most interested in.

FIGS. 15A-15F illustrate embodiments of user interfaces 1501A-1501F in which various information including group fitness objective information may be presented. For example, user interface 1501A may present self-care details including the amount of sleep the user got on a previous night or over a specified timeframe (e.g., a week or a month). The user interface 1501A may indicate that multiple different screens or different portions of information are available, as shown by indicator 1502. The UI element 1503 indicates that this information is private, and thus is only available to that user. The indicator 1504 shows how much sleep the user got, while an icon 1506 helps illustrate, in a graphical manner, the type of information provided on the screen. User interface elements 1505 and 1507 may allow the user to access additional information (1505) or share the information (1507) with other users via stories, social media posts, or via message notifications sent to other selected users.

Figure 15A:
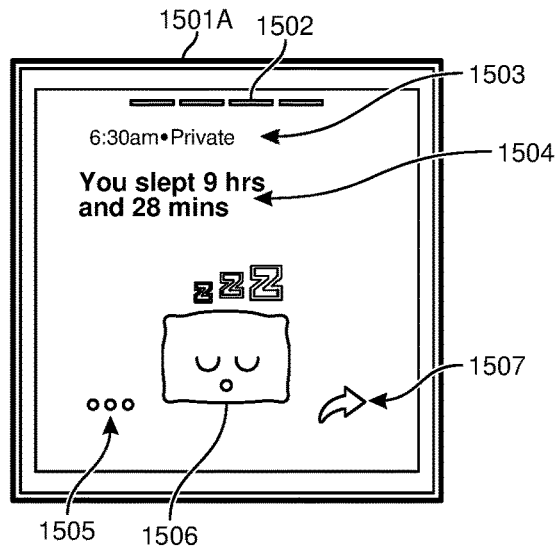
FIGS. 15A-15F illustrate embodiments of user interfaces in which various information including group fitness objective information is presented.
Figure 15B:
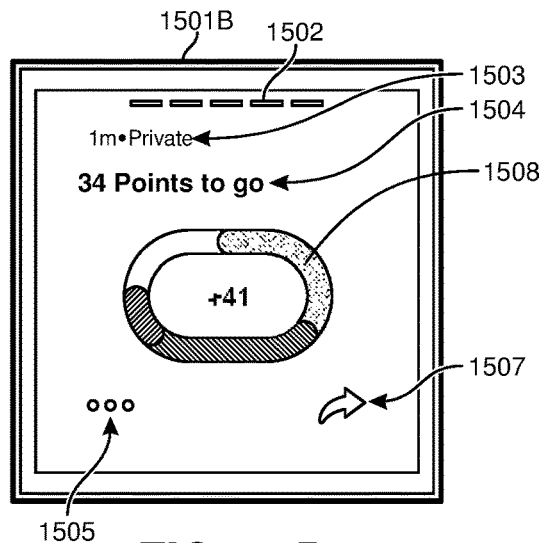
Figure 15C:
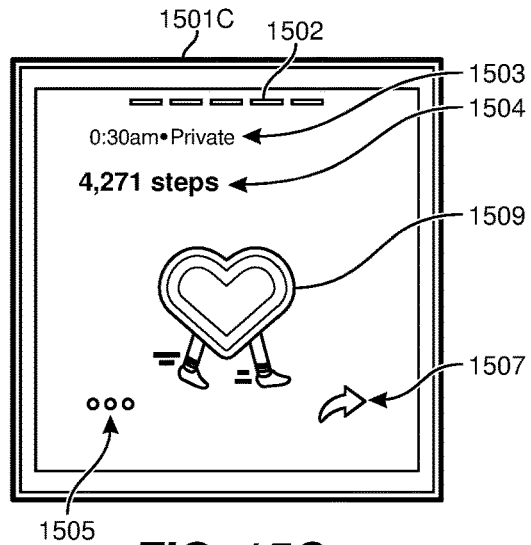
Figure 15D:
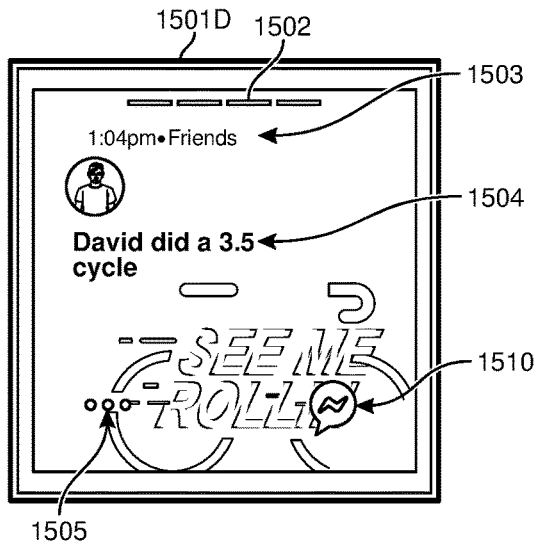
Figure 15E:
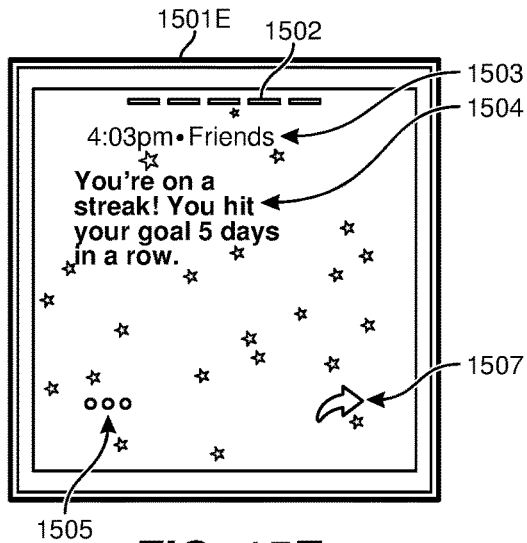
Figure 15F:
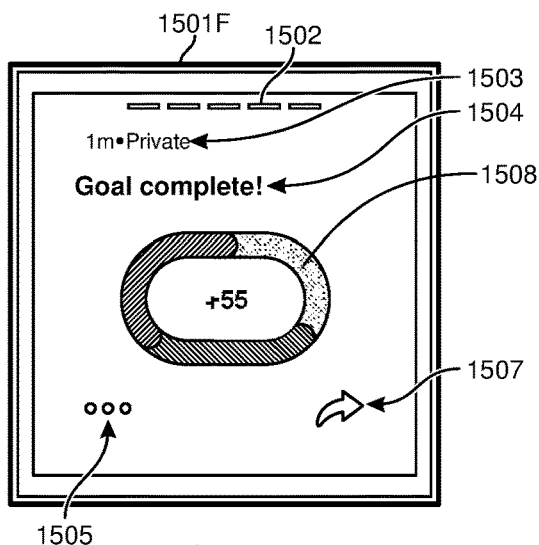
Figure 16A:
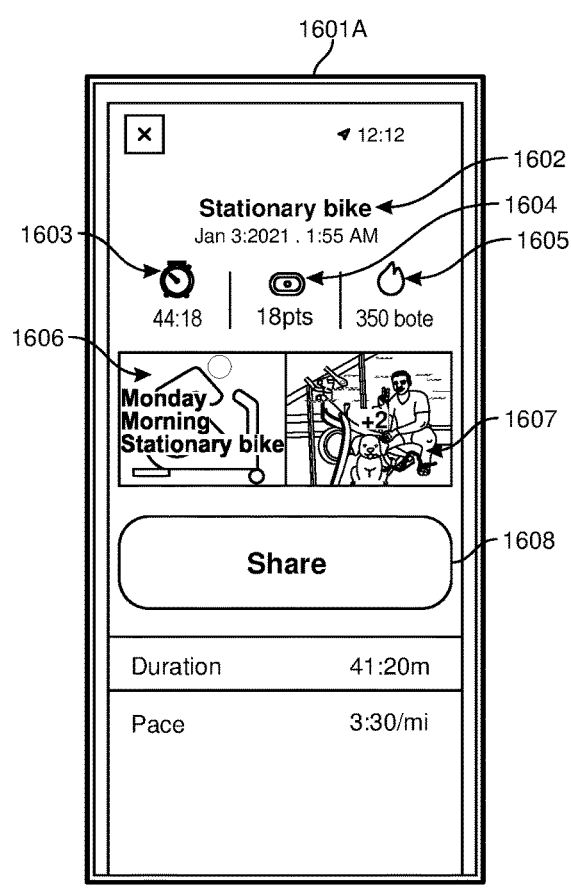
FIGS. 16A-16E illustrate embodiments of user interfaces in which exercise activity summary videos are shown.
Figure 16B:
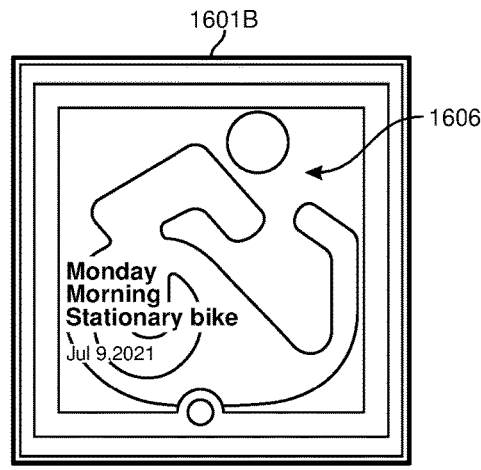
Figure 16C:
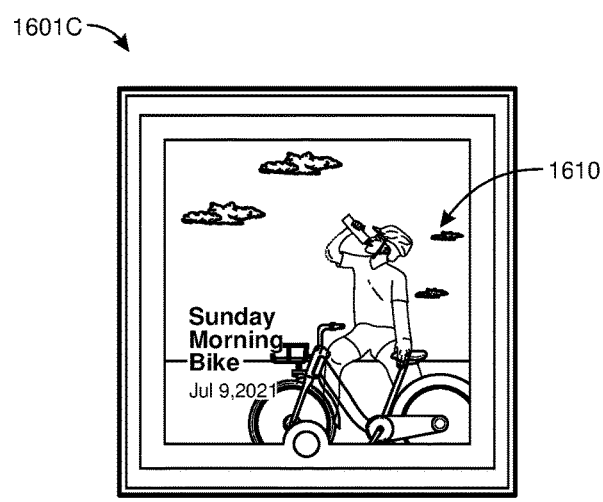
Figure 16D:
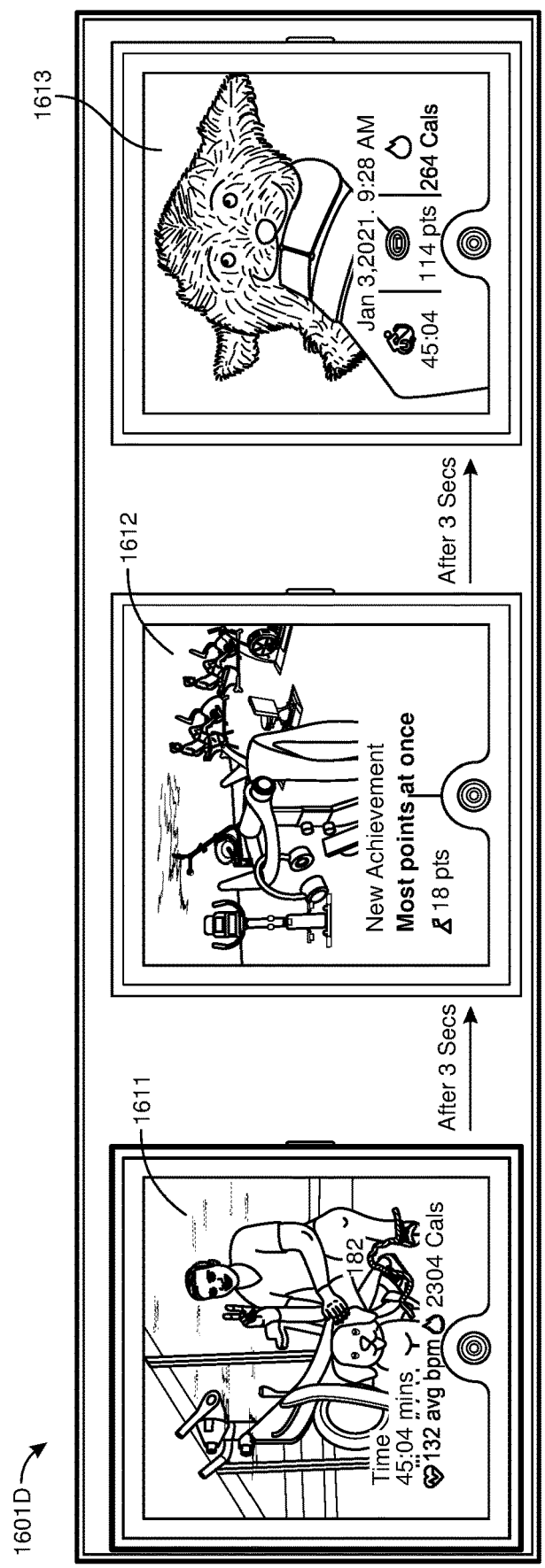
Figure 16E:
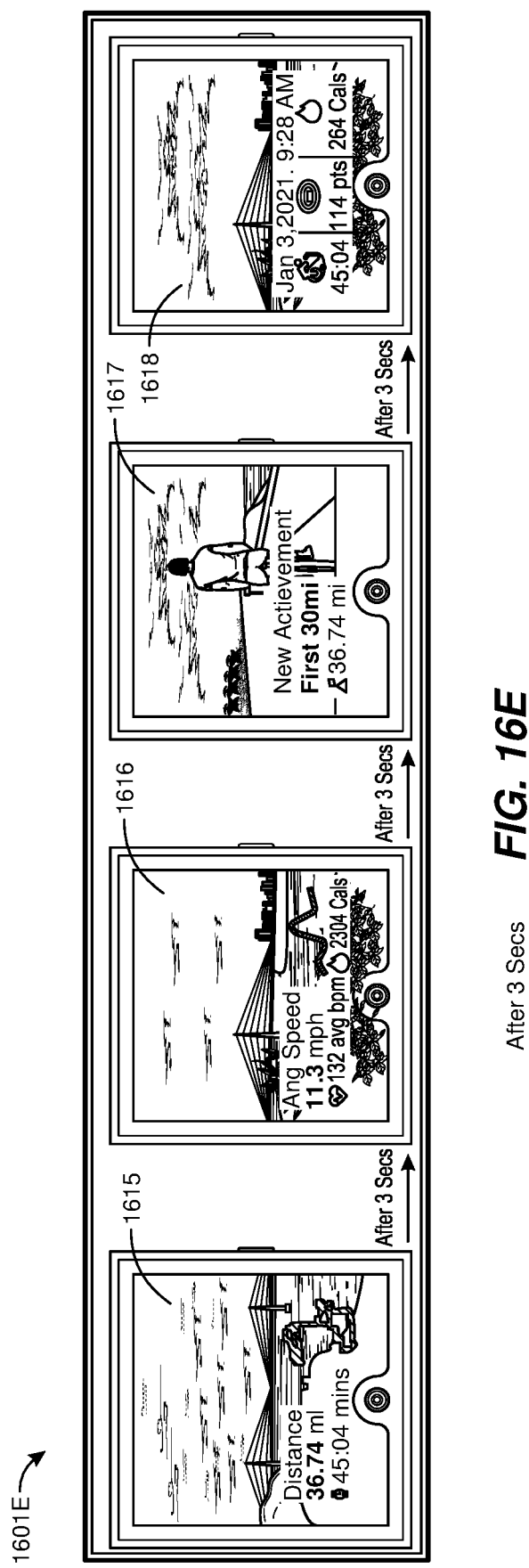
Figure 17D:
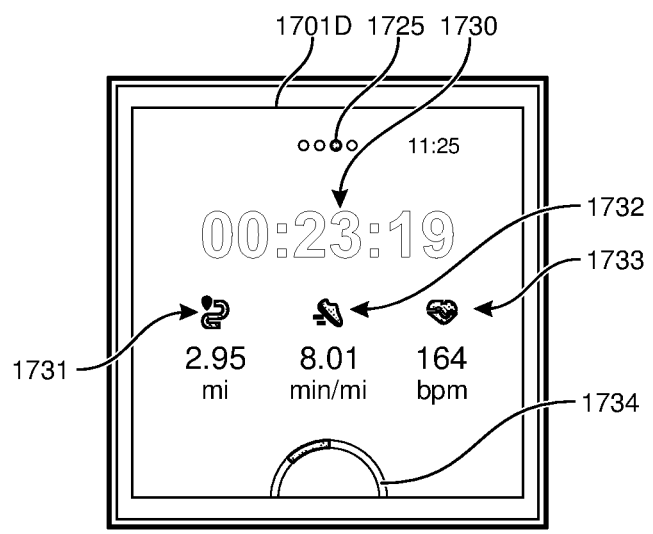
Figure 17E:
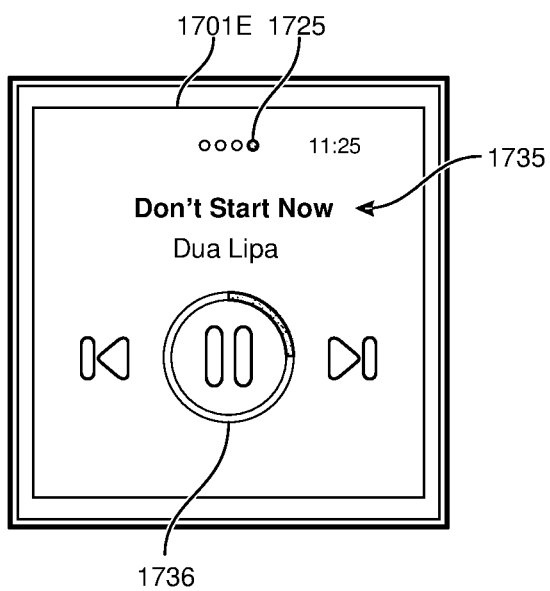

The user interface 1501B of FIG. 15B may illustrate an indication of how many activity points 1508 or activity minutes the user has accrued, while the user interface 1501C of FIG. 15C may provide an indication of how many steps 1509 the user has taken on a given day. Other user interfaces may show activities the user has completed (e.g., 1501D), milestones that the user has hit (e.g., 1501E), or progress toward goals (e.g., 1501F). As shown in FIGS. 15D and 15E, some of this information may be shared with friends (1503), while other information may be kept private (e.g., 1503 in FIG. 15F). Some user interfaces may allow a user to initiate a chat or activate some other type of interactive platform, for example, by selecting a user interface element such as 1510 of FIG. 15D. Using such a UI element, the user may begin audio chatting or video chatting with other users. In some cases, these users may be remote to the user, while in other cases, the users may be nearby.

Figure 21:
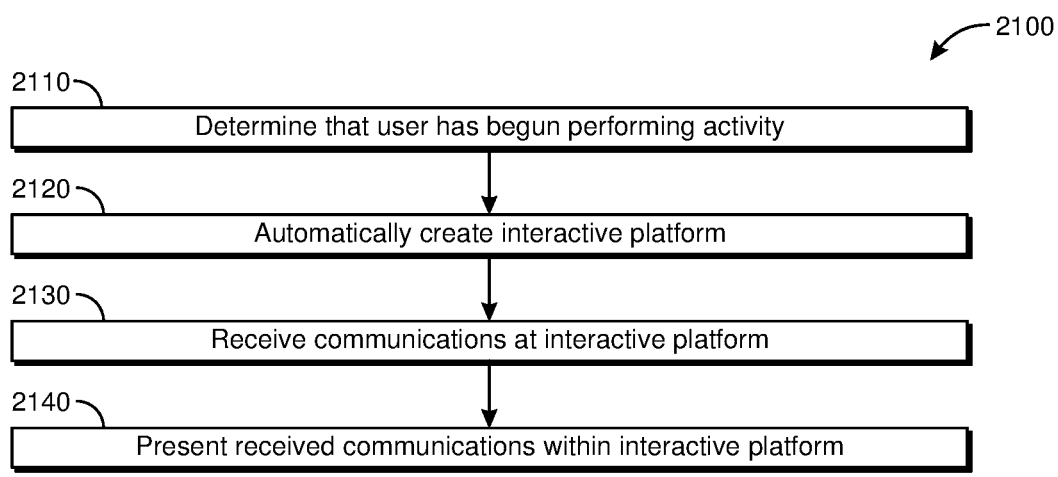
FIG. 21 illustrates a flow diagram of an exemplary method for automatically creating an interactive communication platform upon performing an activity.

In some embodiments, the systems and underlying electronic devices described herein may be configured to automatically detect which users are nearby, and may use that information to improve the user's workout summary. For example, as described in method flow 2100 of FIG. 21, an underlying electronic device may receive, at step 2110, an electromagnetic signal from at least one other electronic device that is within a specified distance of the electronic device. The underlying electronic device may be associated with a given user that is performing an activity, while the other electronic devices may be associated with other users that are also performing the activity (e.g., walking or running a race). The electronic device may determine, at step 2120, that at least one other electronic device is associated with a different specified user and, at step 2130, may generate an activity summary that provides an indication of what occurred during the activity. This activity summary may include at least a portion of information from the other electronic devices associated with the other specified users. Then, at step 2140, the Method 2100 may include providing the generated activity summary for display on the underlying electronic device or on another display.

Thus, at least in some embodiments, a first user may begin performing an activity such as running a race. The user's electronic device (e.g., a smart watch) may include various types of wireless communication including ultrawideband 5G, Bluetooth, near-field communication (NFC), or other types of wireless radios. These wireless radios may be configured to communicate with each other, at least in some case, automatically. In some cases, the wireless radios may receive activity information from other users. In cases where those users are known (e.g., the users are group members or friends of the user), the user may receive activity information associated with those users. In other cases, the user's underlying electronic device may receive anonymized activity data from nearby users. This activity data may include spacing data, indicating how much space currently separates the user from the other users in the race (or other activity). The activity data may also include pace data, indicating pace differentials between the user and those around them.

This pace and/or spacing data may provide an indication of who is next to whom during a race, whose pace is quicker, who is being passed by whom and how quickly. This information may be presented to fans, friends, or other audiences, if permitted by the respective users. Such information may provide interesting, up-to-the-second data regarding where a user is in the race and who they are currently racing against. Moreover, this activity information gleaned from nearby racers (or other users performing a common activity) may be used to bolster or sharpen the accuracy of information tracked by the first user's underlying electronic device. In such examples, other user interfaces similar to those shown in FIGS. 15A-15F, may show that the first user has passed a certain individual in a race, or is running with certain individuals in a race, or is leading another racer at a given point in time. Such information may better involve family and friends or other group members who are cheering for that racer to succeed.

FIGS. 16A-16E illustrate user interface embodiments 1601A-1601E that allow a user to post workout recap stories, videos, or other media. For example, user interface 1601A may provide various interactive UI elements that allow a user to share pictures, videos, workout statistics, or other information to one or more other users. For instance, the user may select the "Share" button 1608 that allows the user to share one or more portions of workout- or activity-related information to other users. The information may include the type of activity 1602, the duration of the activity 1603, the number of activity points or activity minutes associated with that activity 1604, the number of calories burned in association with that activity 1605, or other information. The icon 1606 may include a play button and may link to a workout video. The workout video may provide a summary of a workout and may include any or all of the information described above. In some cases, sequential screenshots are provided that show the workout duration, activity minutes achieved, calories burned, distance traveled, etc. The icon 1607 may include a link to images associated with the activity. The images may have been taken by the user during the activity, or may have been taken by others in a group participating in that activity.

In some cases, a user interface icon 1606 may be provided that leads to a photo recap of a workout. For instance, if a user selected icon 1606 in user interface 1601B of FIG. 16B, the underlying electronic device may display a photographic recap of an indoor cycling workout, for example. Such a photographic recap may be shown in user interface 1601D of FIG. 16D. An initial screen 1611 may show a picture of the user (and his or her dog, in this instance), the duration of the cycling, the average heart rate, the number calories burned, and/or a graph showing a maximum heart rate. In some embodiments, after a set time (e.g., three seconds), a second screen 1612 may be shown. The image may relate to the workout (cycling in this image) and may indicate that the user achieved their highest number of activity points or activity minutes at once. A few seconds later, another image may be shown 1613 showing the date, time, duration (e.g., activity minutes), activity points, and calories burned, among potentially other information. This photo recap may be kept private to the user, or may be shared with friends, groups, or selected individuals. Other self-care details may also be shared if desired, including time spent stretching, time spent on cooldown, time spent doing yoga, time spent listening to audiobooks, podcasts, or mindfulness journeys, time spent sleeping, or other self-care details.

Similarly, the underlying electronic device may automatically generate a workout summary video. This video may be represented by icon 1610 of user interface 1601C of FIG. 16C. If selected, a workout video may be shown as illustrated in user interface 1601E of FIG. 16E. The workout video may include screens showing an overall distance (1615), route traveled (1615), an average speed and/or average number of calories burned (1616), new achievements reached (1617), and a workout summary screen (1618) that includes different types of data related to the workout. Other self-care data may also be included, and may be packaged into the workout recap video. Still further, the workout video recap may include an indication of the user's progress toward an individual goal, toward a group goal, toward a direct challenge or group challenge, and may show the group's progress toward those challenges as well. The icon elements 1606 and 1610 may also allow users to share the photo recaps or video recaps with other users including single users or groups of users.

FIGS. 17A-17E illustrate embodiments of user interfaces 1701A-1701E in which different fitness-related options may be presented to users and, more specifically, options that involve the playback of music. In some cases, a user interface (e.g., 1701A of FIG. 17A) may include various interactive elements that provide access to underlying software and/or hardware functionality. For instance, user interface 1701A may provide icons (1702) and indicators (1703) leading to information related to the user's recent workouts. For instance, the user may select 1704 to view their last 30-minute walk (or to start a new 30-minute walk), or may select 1705 to view their last one-mile run (or to start a new one-mile run), or may select 1706 to view their last free cycle session, or may select 1707 to view (or start) other workouts or activities. Similarly, the user may select UI element 1709 to view (or start) a 5 k run challenge as part of various challenges 1708, or may select UI element 1710 to view (or start) a half marathon challenge, or may select UI element 1711 to view (or start) a 25-mile bicycling challenge, or may select UI element 1712 to view other direct or group challenges. Still further, the user may select UI element 1713 to view past workouts and may select UI element 1714 to view software and/or hardware device settings.

If the user were to select the 5 k run challenge button (1709), the underlying electronic device may present a new UI 1701B. The user interface 1701B may indicate to the user their current standing in a 5 k run challenge 1715. UI element 1716 may allow the user to start the 5 k run challenge, while element 1717 may indicate the user's friends' 5 k run challenge times at 1718 and 1719. The "Community" tab 1720 may identify other members of the group (e.g., 1721 and 1722) that have been invited to take part in the 5 k run challenge. User interface 1701C of FIG. 17C may illustrate, in a second tab 1725, an oval graph 1726 showing where each user is in relation to each other in relation to the 5 k run challenge. The identifier 1728 may show live results, indicating that the user of the underlying electronic device is in first place, while other users 1727 are trailing on their way around the oval graph 1726. Icons 1728 and 1729 may indicate who is in the lead, and who is following and by how much. This oval graph may be updated dynamically as various users pass each other or get passed by other participants.

In another tab 1725, user interface 1701D may illustrate the current time (1730), the current distance run (1731), the current pace (1732), the user's current heart rate (1733), as well as other activity indicators (1734). In a different tab 1725, the user interface 1701E of FIG. 17E may include a music playback interface. This music playback interface may show the title of the current song (1735), as well as an indicator of how far along the song is relative to its total length (1736). As playback progresses, a filled-in (e.g., colored) portion may grow larger and larger until the entire ring is filled in. In some cases, when a user takes a photo during an activity or captures a video during an activity, that user may be listening to a song (e.g., 1735). The underling electronic device may make a note of which song was playing when the photograph was taken or when the video was captured.

Moreover, at least in some cases, the underlying electronic device may note where in the song playback was currently at when the photograph was taken or when the video was captured. Then, when the user posts that photograph or video, the song that was currently playing may be automatically posted with or attached to that photo or video. In some cases, the song is played back at the same playback position it was at when the photo or video was taken. Thus, if a song was at 1:05 in playback position when a photo or video was captured, in the photo recap or video recap post, the song may be played back starting at 1:05. In this manner, friends or other group users may experience the moment the photo or video was taken in a similar manner to that experienced by the user who took the picture or captured the video.

Figure 22:
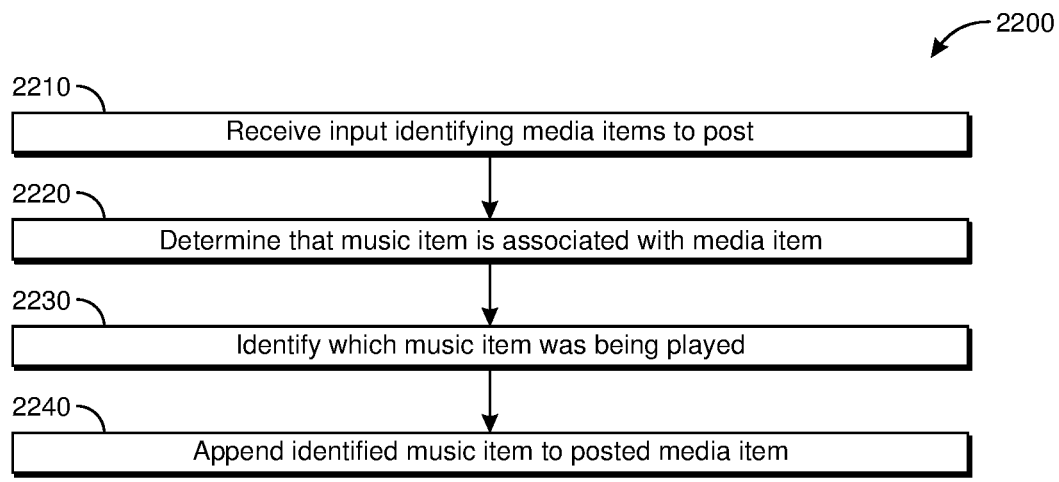
FIG. 22 illustrates a flow diagram of an exemplary method for automatically appending a music item that was playing at a time of media capture to a social media post.

This method may be further described with regard to Method 2200 of FIG. 22. At step 2210, Method 2200 include receiving input indicating that one or more media items related to an activity are to be posted on a social media platform. The media items may be photos, videos, text messages, emoticons, short-form messages, asynchronous video chats, or other media items. Next, at step 2220, Method 2200 may include determining that at least one music item was playing when the media items were being recorded and identifying, at step 2230, which music item was being played when the media items were being recorded. Then, at step 2240, the Method 2200 may include appending the identified music item to the recorded media items, such that the music playing when the media items were being recorded is played back when playing back the media items.

Thus, as outlined above, the underlying electronic device may determine that various media items (e.g., photos or videos) are to be posted online. The underlying electronic device may then determine that a specific song was playing on the underlying electronic device when the media was captured or created. The electronic device may then append that song or may associate that song with the media item(s) in the post. Then, as the media items in the post are played back, the identified song may be played back with those media items. Each media item in a post may have different songs associated with them, depending on which song was playing when the media items were each created. Still further, in at least some embodiments, the associated song may be played back in the same playback position it was in when the media item(s) were created. As such, if a user took a picture or captured a video during a workout, and was listening to a specific song, that song may be associated with the picture or video, and may be played back alongside that picture or video when posted and viewed online.

Figures 18A, 18B:
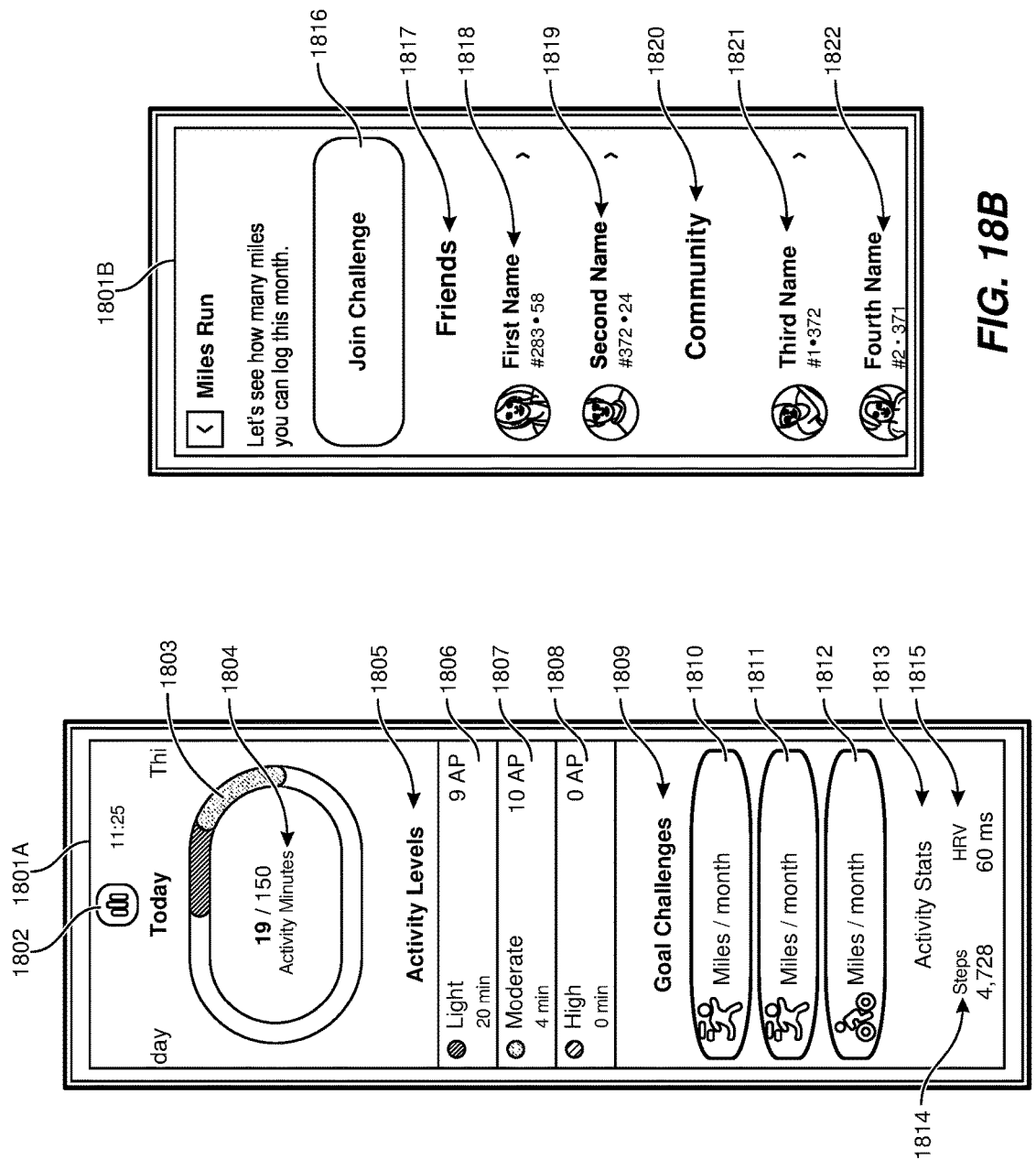
FIGS. 18A and 18B illustrate embodiments of user interfaces in which group fitness objectives are presented and tracked.

FIGS. 18A-18B illustrate embodiments of user interfaces 1801A/1801B within which users may initiate or participate in direct or group challenges. FIG. 18A provides a user interface 1801A that gives an indication of the user's activity level. The icon 1802 may indicate that the user interface 1801A is intended to show activity statistics. For instance, the UI 1801A may show a current number activity minutes 1804, and further illustrated in an activity minutes graphic 1803. The UI 1801A may show various activity levels 1805 when participating in a direct or group challenge. The activity levels may include light (1806), moderate (1807), and high (1808) or other activity levels. The activity levels 1805 may also indicate a number of activity minutes achieved in each activity level. Still further, the UI may provide access to different goal challenges 1809, including a number of walking miles per month (1810), a number of running miles per month (1811), a number of cycling miles per month (1812), or may show other goals, including mindfulness goals. Other activity statistics 1813 may include a number of steps taken 1814 and a heart rate variability (HRV) measurement 1815.

If the user were to select interactive UI element 1811, the user may be taken to UI 1801B, showing a miles run challenge that is available. By selecting button 1816, the user may join this running-miles-per-month challenge. Within this challenge, various friends 1817 may be listed, each of which may be selectable to view additional statistical information related to those users (e.g., 1818 and 1819). Other people in the running community 1820 that are potentially not part of the running challenge (e.g., users 1821 and 1822) may be invited to join the challenge. Thus, within these user interfaces, users may view available challenges, take part in challenges, and view statistics related to activity and progress toward a group challenge goal.

In some cases, whether part of a challenge, or outside of a challenge, a user may wish to provide unlockable digital items. For instance, as part of a running challenge, a user may capture a video or take a picture and then associate that video or picture with a location. Then, as part of the running challenge, anyone that ran to the specified location may be able to access the video or picture associated with that location. In this manner, the digital item is "unlocked" by going to the specified location. In some cases, the digital item is only unlocked by participating in a group challenge. Thus, if the group challenge is running related, then the user would need to run to the specified location. If the group challenge is hiking related, the user may need to hike to the specified location. Such running or hiking may be verified using step counters, GPS data including rate of travel, heart rate, or other sensor data.

Figure 23:
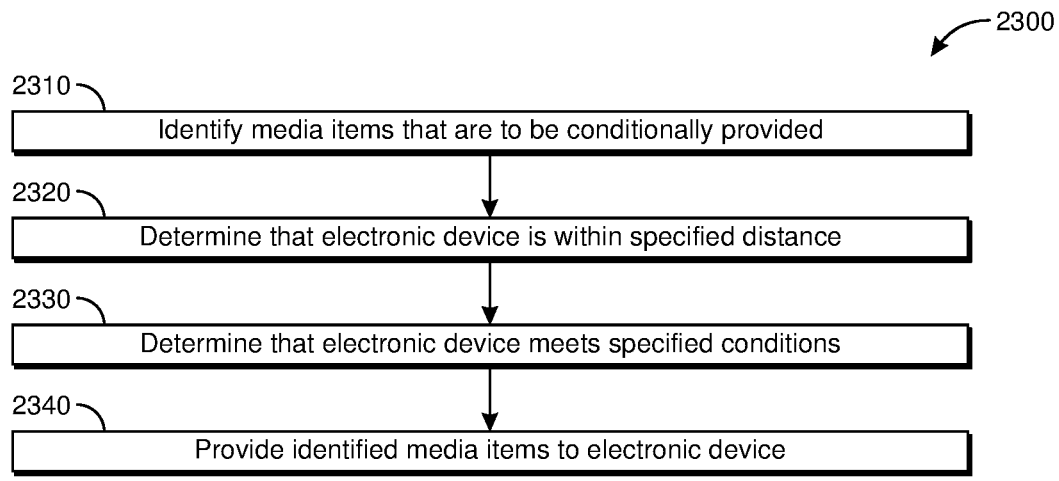
FIG. 23 illustrates a flow diagram of an exemplary method for providing unlockable digital media items.

Method 2300 of FIG. 23 describes a method for generating and providing unlockable digital items. In at least some cases, these digital items may be audio and/or video that is accessible using an electronic device. The Method 2300 may include, at step 2310, identifying one or more media items that are to be conditionally provided to electronic devices that are located within a specified distance of a given location. At step 2320, the Method 2300 may determining that an electronic device is within the specified distance of the location, and, at step 2330, may include determining that the electronic device that is within the specified distance of the location meets one or more specified conditions. Then, at step 2340, the Method 2300 may include providing the identified media items to the electronic device.

Thus, a user may drop a video clip, an audio clip, a photo, a sticker, a UI skin, or other digital item at a given location, and may specify different requirements for unlocking the digital item. If those requirements are met by another user, that user may be able to view and/or store the digital item. In cases where the unlockable digital item is a UI skin, that UI skin may be applied to the user's underlying device. As such, the UI skin may provide a sort of proof that the user made it to the specified location and fulfilled the unlocking requirements to successfully unlock the UI skin. Thus, UI skins or other digital items may be used to incentivize people to participate in direct or group challenges as issued through the various user interfaces described herein.

In other embodiments, a user may participate in a challenge and may, as part of a challenge, unlock access to virtual goods (e.g., a unique watch face) and/or physical goods (e.g., unique watch band). For example, a user may join a group challenge that specifies a certain number of minutes of activity for a group (e.g., 10,000 minutes). The user's portion of the minutes may, in this example, be 1,000 minutes. If the user reaches 1,000 minutes (or some other specified goal), the user may be rewarded with virtual goods (e.g., a video clip, an audio clip, a unique watch face, a unique skin for an application (e.g., a fitness application), a non-fungible token (NFT), or some other virtual good. Moreover, the user may be eligible to receive a physical good including a new watch band, a free food item, a coupon, a fitness-related item, or other physical good. Thus, users may be incentivized to participate in group challenges and group goals by receiving virtual or physical goods for completion of their portion of the group goal.

Accordingly, in this manner, mobile electronic devices and corresponding user interfaces may be provided that allow users to create and track progress toward group fitness objectives. Moreover, these devices and interfaces allow users to share workout data with other users in a live manner, or via posts or stories created after their workouts. In this manner, individuals may perform individualized workouts while still feeling part of a larger fitness group that may set challenges for each other, send shareable badges, and generally encourage each other to succeed in achieving their fitness objectives.

Example Embodiments

Example 1: A computer-implemented method for generating a combined user interface may include receiving at least one input identifying, for a group of users, a shared group fitness objective that is attainable through a combined effort of multiple individual users within the group of users, tracking, via sensor data received from one or more hardware sensors, an individual user's efforts with respect to the identified group fitness objective, generating a combined user interface that illustrates both an individual progress indicator illustrating the individual user's efforts with respect to the group fitness objective, and a group progress indicator illustrating the group of users' efforts with respect to the group fitness objective, and presenting the combined user interface on a display.

Example 2: The computer-implemented method of Example 1, wherein each individual user's efforts with respect to the group fitness objective increment the group's progress toward the group fitness objective.

Example 3: The computer-implemented method of any of Examples 1 and 2, wherein the one or more hardware sensors comprise at least one of the following: an electrical heart sensor, an optical heart sensor, a global positioning system (GPS) sensor, an inertial measurement unit (IMU), an accelerometer, a gyroscope, a magnetometer, a pulse oximeter, and/or an electrochemical sweat sensor.

Example 4: The computer-implemented method of any of Examples 1-3, wherein the combined user interface comprises a double ring, wherein a first ring of the double ring represents the individual user's efforts with respect to the group fitness objective, and wherein a second ring of the double ring represents the group of users' efforts with respect to the group fitness objective.

Example 5: The computer-implemented method of any of Examples 1-4, wherein the group fitness objective comprises at least one of a collaborative group fitness objective or a competitive group fitness objective.

Example 6: The computer-implemented method of any of Examples 1-5, wherein the combined user interface is configured to present at least one of a direct challenge between two specific group users or a group challenge between the group of users.

Example 7: The computer-implemented method of any of Examples 1-6, wherein results from the group challenge are automatically posted to a social graph associated with the group of users.

Example 8: The computer-implemented method of any of Examples 1-7, wherein the combined user interface is configured to present one or more user interface elements that facilitate integration with one or more other applications.

Example 9: The computer-implemented method of any of Examples 1-8, wherein at least one of the one or more other applications accessible through the combined user interface comprises a messaging application that allows the group of users to send messages to each other.

Example 10: The computer-implemented method of any of Examples 1-9, wherein at least one of the one or more other applications accessible through the combined user interface comprises a social media application that allows the group of users to post stories that are available to specified social media users.

Example 11: The computer-implemented method of any of Examples 1-10, wherein the combined user interface is configured to present a second, different individual user's efforts with respect to the identified group fitness objective, in addition to the individual progress indicator and the group progress indicator.

Example 12: The computer-implemented method of any of Examples 1-11, wherein the individual user specifies who the second, different user is.

Example 13: A system for generating a combined user interface may include at least one physical processor and physical memory comprising computer-executable instructions that, when executed by the physical processor, cause the physical processor to: receive at least one input identifying, for a group of users, a shared group fitness objective that is attainable through a combined effort of multiple individual users within the group of users, track, via sensor data received from one or more hardware sensors, an individual user's efforts with respect to the identified group fitness objective, generate a combined user interface that illustrates both an individual progress indicator illustrating the individual user's efforts with respect to the group fitness objective, and a group progress indicator illustrating the group of users' efforts with respect to the group fitness objective, and present the combined user interface on a display.

Example 14: The system of Example 13, wherein the generated combined user interface includes a virtual workout companion that performs one or more functions with respect to the individual user's efforts in relation to the identified group fitness objective.

Example 15: The system of any of Examples 13 or 14, wherein at least one of the one or more functions performed by the virtual workout companion comprises presenting workout metrics of at least one of the virtual workout companion or a second, different individual in the group of users.

Example 16: The system of any of Examples 13-15, wherein the workout metrics of the virtual workout companion are based on past workout data for one or more users.

Example 17: The system of any of Examples 13-16, wherein at least one of the one or more functions performed by the virtual workout companion comprises presenting a direct fitness challenge received from another user.

Example 18: The system of any of Examples 13-17, wherein the combined user interface is configured to present an indication of the individual user's progress toward the direct fitness challenge along with an indication of the other user's progress toward the fitness challenge.

Example 19: The system of any of Examples 13-18, further including tracking one or more self-care indicators for at least one member of the group and providing one or more of the tracked self-care indicators to at least a portion of the group of users.

Example 20: A non-transitory computer-readable medium may include one or more computer-executable instructions that, when executed by at least one processor of a computing device, cause the computing device to: receive at least one input identifying, for a group of users, a shared group fitness objective that is attainable through a combined effort of multiple individual users within the group of users, track, via sensor data received from one or more hardware sensors, an individual user's efforts with respect to the identified group fitness objective, generate a combined user interface that illustrates both an individual progress indicator illustrating the individual user's efforts with respect to the group fitness objective, and a group progress indicator illustrating the group of users' efforts with respect to the group fitness objective, and present the combined user interface on a display.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented reality system 2400 in FIG. 24) or that visually immerses a user in an artificial reality (such as, e.g., virtual-reality system 2500 in FIG. 25). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 24:
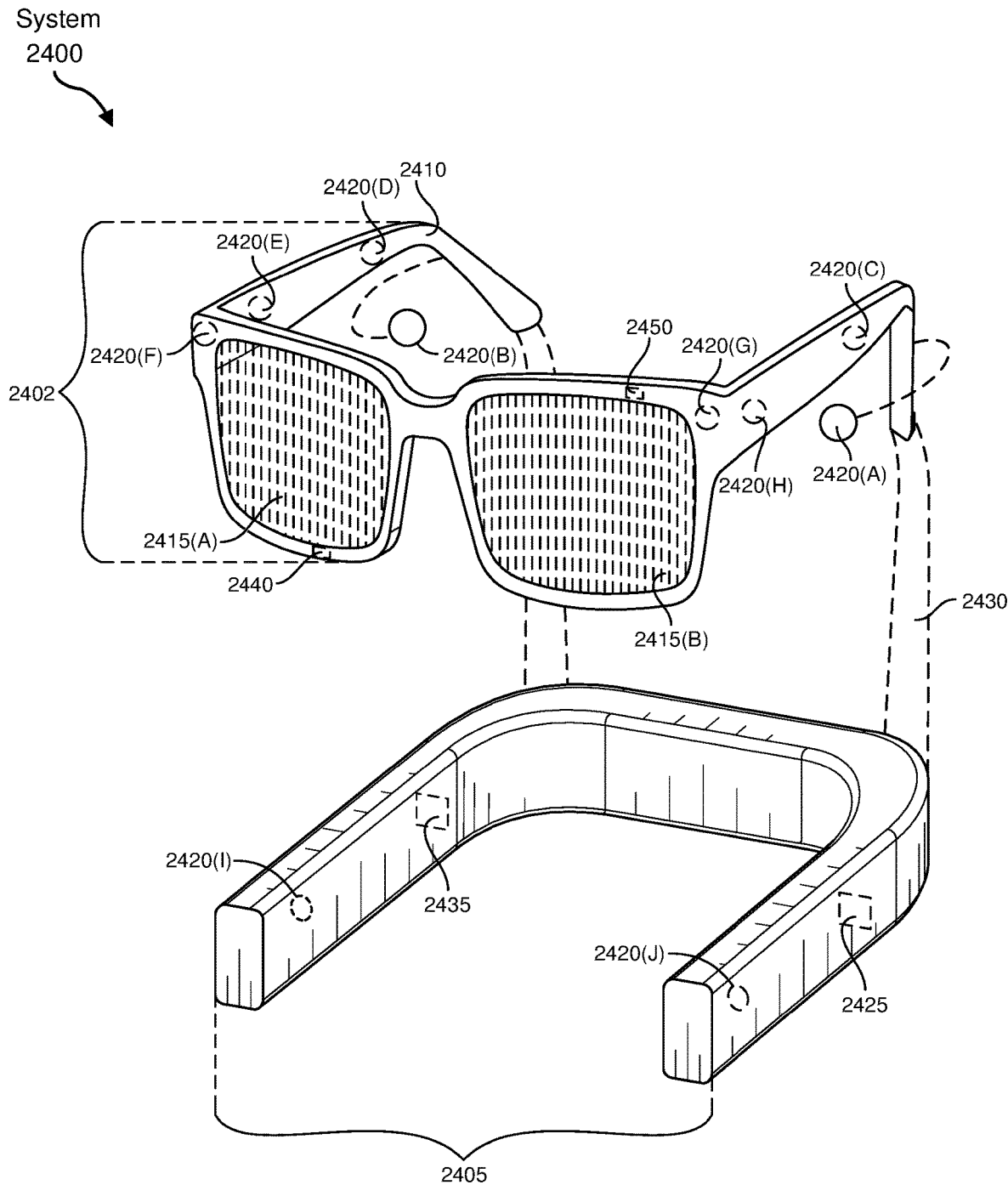
FIG. 24 is an illustration of exemplary augmented-reality glasses that may be used in connection with embodiments of this disclosure.

Turning to FIG. 24, augmented-reality system 2400 may include an eyewear device 2402 with a frame 2410 configured to hold a left display device 2415(A) and a right display device 2415(B) in front of a user's eyes. Display devices 2415(A) and 2415(B) may act together or independently to present an image or series of images to a user. While augmented-reality system 2400 includes two displays, embodiments of this disclosure may be implemented in augmented-reality systems with a single NED or more than two NEDs.

In some embodiments, augmented-reality system 2400 may include one or more sensors, such as sensor 2440. Sensor 2440 may generate measurement signals in response to motion of augmented-reality system 2400 and may be located on substantially any portion of frame 2410. Sensor 2440 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2400 may or may not include sensor 2440 or may include more than one sensor. In embodiments in which sensor 2440 includes an IMU, the IMU may generate calibration data based on measurement signals from sensor 2440. Examples of sensor 2440 may include, without limitation, accelerometers, gyroscopes, magnetometers, other suitable types of sensors that detect motion, sensors used for error correction of the IMU, or some combination thereof.

In some examples, augmented-reality system 2400 may also include a microphone array with a plurality of acoustic transducers 2420(A)-2420(J), referred to collectively as acoustic transducers 2420. Acoustic transducers 2420 may represent transducers that detect air pressure variations induced by sound waves. Each acoustic transducer 2420 may be configured to detect sound and convert the detected sound into an electronic format (e.g., an analog or digital format). The microphone array in FIG. 24 may include, for example, ten acoustic transducers: 2420(A) and 2420(B), which may be designed to be placed inside a corresponding ear of the user, acoustic transducers 2420(C), 2420(D), 2420(E), 2420(F), 2420(G), and 2420(H), which may be positioned at various locations on frame 2410, and/or acoustic transducers 2420(I) and 2420(J), which may be positioned on a corresponding neckband 2405.

In some embodiments, one or more of acoustic transducers 2420(A)-(J) may be used as output transducers (e.g., speakers). For example, acoustic transducers 2420(A) and/or 2420(B) may be earbuds or any other suitable type of headphone or speaker.

The configuration of acoustic transducers 2420 of the microphone array may vary. While augmented-reality system 2400 is shown in FIG. 24 as having ten acoustic transducers 2420, the number of acoustic transducers 2420 may be greater or less than ten. In some embodiments, using higher numbers of acoustic transducers 2420 may increase the amount of audio information collected and/or the sensitivity and accuracy of the audio information. In contrast, using a lower number of acoustic transducers 2420 may decrease the computing power required by an associated controller 2450 to process the collected audio information. In addition, the position of each acoustic transducer 2420 of the microphone array may vary. For example, the position of an acoustic transducer 2420 may include a defined position on the user, a defined coordinate on frame 2410, an orientation associated with each acoustic transducer 2420, or some combination thereof.

Acoustic transducers 2420(A) and 2420(B) may be positioned on different parts of the user's ear, such as behind the pinna, behind the tragus, and/or within the auricle or fossa. Or, there may be additional acoustic transducers 2420 on or surrounding the ear in addition to acoustic transducers 2420 inside the ear canal. Having an acoustic transducer 2420 positioned next to an ear canal of a user may enable the microphone array to collect information on how sounds arrive at the ear canal. By positioning at least two of acoustic transducers 2420 on either side of a user's head (e.g., as binaural microphones), augmented-reality device 2400 may simulate binaural hearing and capture a 3D stereo sound field around about a user's head. In some embodiments, acoustic transducers 2420(A) and 2420(B) may be connected to augmented-reality system 2400 via a wired connection 2430, and in other embodiments acoustic transducers 2420(A) and 2420(B) may be connected to augmented-reality system 2400 via a wireless connection (e.g., a Bluetooth connection). In still other embodiments, acoustic transducers 2420(A) and 2420(B) may not be used at all in conjunction with augmented-reality system 2400.

Acoustic transducers 2420 on frame 2410 may be positioned in a variety of different ways, including along the length of the temples, across the bridge, above or below display devices 2415(A) and 2415(B), or some combination thereof. Acoustic transducers 2420 may also be oriented such that the microphone array is able to detect sounds in a wide range of directions surrounding the user wearing the augmented-reality system 2400. In some embodiments, an optimization process may be performed during manufacturing of augmented-reality system 2400 to determine relative positioning of each acoustic transducer 2420 in the microphone array.

In some examples, augmented-reality system 2400 may include or be connected to an external device (e.g., a paired device), such as neckband 2405. Neckband 2405 generally represents any type or form of paired device. Thus, the following discussion of neckband 2405 may also apply to various other paired devices, such as charging cases, smart watches, smart phones, wrist bands, other wearable devices, hand-held controllers, tablet computers, laptop computers, other external compute devices, etc.

As shown, neckband 2405 may be coupled to eyewear device 2402 via one or more connectors. The connectors may be wired or wireless and may include electrical and/or non-electrical (e.g., structural) components. In some cases, eyewear device 2402 and neckband 2405 may operate independently without any wired or wireless connection between them. While FIG. 24 illustrates the components of eyewear device 2402 and neckband 2405 in example locations on eyewear device 2402 and neckband 2405, the components may be located elsewhere and/or distributed differently on eyewear device 2402 and/or neckband 2405. In some embodiments, the components of eyewear device 2402 and neckband 2405 may be located on one or more additional peripheral devices paired with eyewear device 2402, neckband 2405, or some combination thereof.

Pairing external devices, such as neckband 2405, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2400 may be provided by a paired device or shared between a paired device and an eyewear device, thus reducing the weight, heat profile, and form factor of the eyewear device overall while still retaining desired functionality. For example, neckband 2405 may allow components that would otherwise be included on an eyewear device to be included in neckband 2405 since users may tolerate a heavier weight load on their shoulders than they would tolerate on their heads. Neckband 2405 may also have a larger surface area over which to diffuse and disperse heat to the ambient environment. Thus, neckband 2405 may allow for greater battery and computation capacity than might otherwise have been possible on a stand-alone eyewear device. Since weight carried in neckband 2405 may be less invasive to a user than weight carried in eyewear device 2402, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 2405 may be communicatively coupled with eyewear device 2402 and/or to other devices. These other devices may provide certain functions (e.g., tracking, localizing, depth mapping, processing, storage, etc.) to augmented-reality system 2400. In the embodiment of FIG. 24, neckband 2405 may include two acoustic transducers (e.g., 2420(I) and 2420(J)) that are part of the microphone array (or potentially form their own microphone subarray). Neckband 2405 may also include a controller 2425 and a power source 2435.

Acoustic transducers 2420(I) and 2420(J) of neckband 2405 may be configured to detect sound and convert the detected sound into an electronic format (analog or digital). In the embodiment of FIG. 24, acoustic transducers 2420(I) and 2420(J) may be positioned on neckband 2405, thereby increasing the distance between the neckband acoustic transducers 2420(I) and 2420(J) and other acoustic transducers 2420 positioned on eyewear device 2402. In some cases, increasing the distance between acoustic transducers 2420 of the microphone array may improve the accuracy of beamforming performed via the microphone array. For example, if a sound is detected by acoustic transducers 2420(C) and 2420(D) and the distance between acoustic transducers 2420(C) and 2420(D) is greater than, e.g., the distance between acoustic transducers 2420(D) and 2420(E), the determined source location of the detected sound may be more accurate than if the sound had been detected by acoustic transducers 2420(D) and 2420(E).

Controller 2425 of neckband 2405 may process information generated by the sensors on neckband 2405 and/or augmented-reality system 2400. For example, controller 2425 may process information from the microphone array that describes sounds detected by the microphone array. For each detected sound, controller 2425 may perform a direction-of-arrival (DOA) estimation to estimate a direction from which the detected sound arrived at the microphone array. As the microphone array detects sounds, controller 2425 may populate an audio data set with the information. In embodiments in which augmented-reality system 2400 includes an inertial measurement unit, controller 2425 may compute all inertial and spatial calculations from the IMU located on eyewear device 2402. A connector may convey information between augmented-reality system 2400 and neckband 2405 and between augmented-reality system 2400 and controller 2425. The information may be in the form of optical data, electrical data, wireless data, or any other transmittable data form. Moving the processing of information generated by augmented-reality system 2400 to neckband 2405 may reduce weight and heat in eyewear device 2402, making it more comfortable to the user.

Power source 2435 in neckband 2405 may provide power to eyewear device 2402 and/or to neckband 2405. Power source 2435 may include, without limitation, lithium ion batteries, lithium-polymer batteries, primary lithium batteries, alkaline batteries, or any other form of power storage. In some cases, power source 2435 may be a wired power source. Including power source 2435 on neckband 2405 instead of on eyewear device 2402 may help better distribute the weight and heat generated by power source 2435.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2500 in FIG. 25, that mostly or completely covers a user's field of view. Virtual-reality system 2500 may include a front rigid body 2502 and a band 2504 shaped to fit around a user's head. Virtual-reality system 2500 may also include output audio transducers 2506(A) and 2506(B). Furthermore, while not shown in FIG. 25, front rigid body 2502 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 2400 and/or virtual-reality system 2500 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2400 and/or virtual-reality system 2500 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2400 and/or virtual-reality system 2500 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, augmented-reality systems 2400 and 2500 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 26:
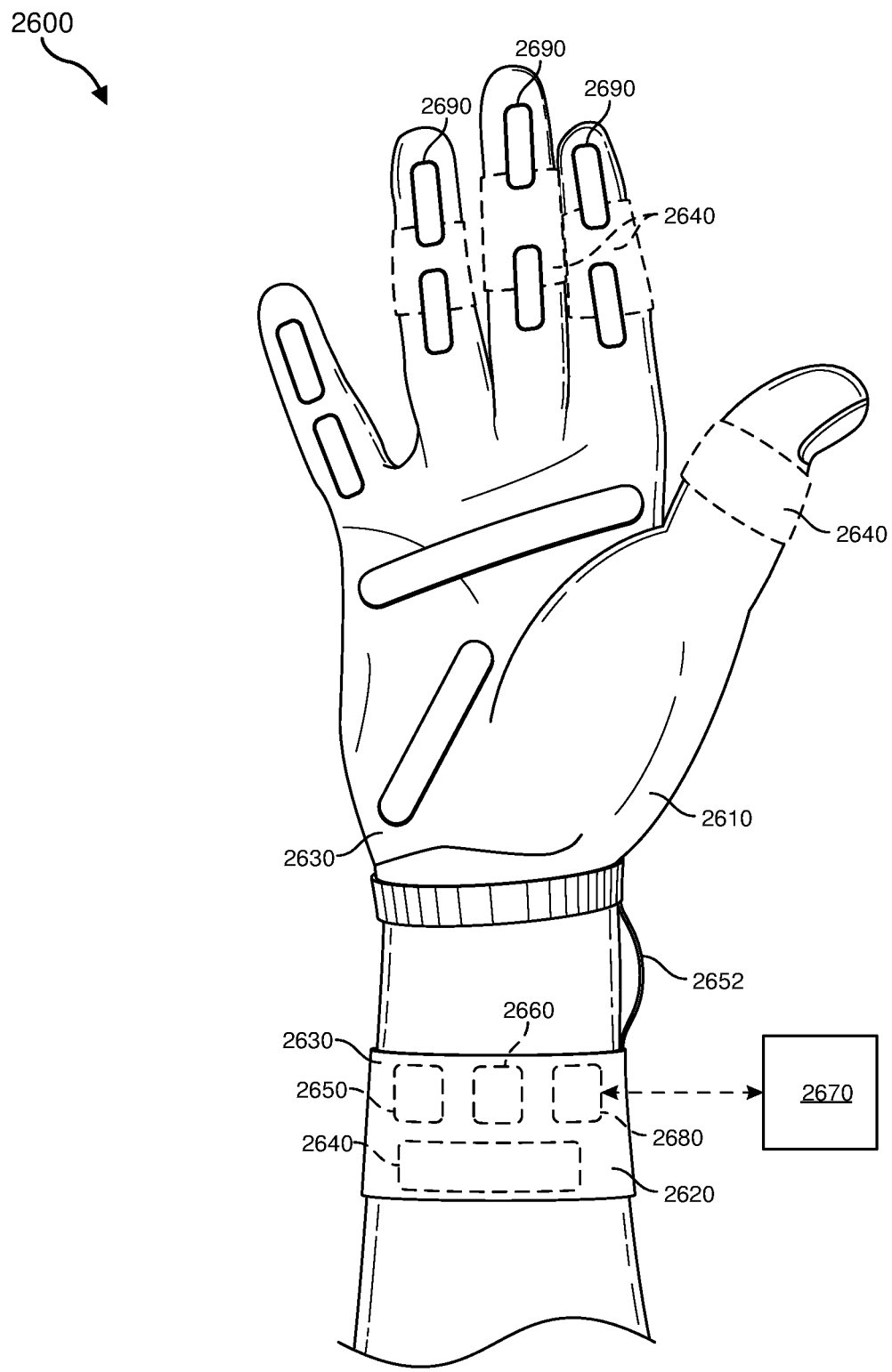
FIG. 26 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 26 illustrates a vibrotactile system 2600 in the form of a wearable glove (haptic device 2610) and wristband (haptic device 2620). Haptic device 2610 and haptic device 2620 are shown as examples of wearable devices that include a flexible, wearable textile material 2630 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 2640 may be positioned at least partially within one or more corresponding pockets formed in textile material 2630 of vibrotactile system 2600. Vibrotactile devices 2640 may be positioned in locations to provide a vibrating sensation (e.g., haptic feedback) to a user of vibrotactile system 2600. For example, vibrotactile devices 2640 may be positioned against the user's finger(s), thumb, or wrist, as shown in FIG. 26. Vibrotactile devices 2640 may, in some examples, be sufficiently flexible to conform to or bend with the user's corresponding body part(s).

A power source 2650 (e.g., a battery) for applying a voltage to the vibrotactile devices 2640 for activation thereof may be electrically coupled to vibrotactile devices 2640, such as via conductive wiring 2652. In some examples, each of vibrotactile devices 2640 may be independently electrically coupled to power source 2650 for individual activation. In some embodiments, a processor 2660 may be operatively coupled to power source 2650 and configured (e.g., programmed) to control activation of vibrotactile devices 2640.

Vibrotactile system 2600 may be implemented in a variety of ways. In some examples, vibrotactile system 2600 may be a standalone system with integral subsystems and components for operation independent of other devices and systems. As another example, vibrotactile system 2600 may be configured for interaction with another device or system 2670. For example, vibrotactile system 2600 may, in some examples, include a communications interface 2680 for receiving and/or sending signals to the other device or system 2670. The other device or system 2670 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 2680 may enable communications between vibrotactile system 2600 and the other device or system 2670 via a wireless (e.g., Wi-Fi, Bluetooth, cellular, radio, etc.) link or a wired link. If present, communications interface 2680 may be in communication with processor 2660, such as to provide a signal to processor 2660 to activate or deactivate one or more of the vibrotactile devices 2640.

Vibrotactile system 2600 may optionally include other subsystems and components, such as touch-sensitive pads 2690, pressure sensors, motion sensors, position sensors, lighting elements, and/or user interface elements (e.g., an on/off button, a vibration control element, etc.). During use, vibrotactile devices 2640 may be configured to be activated for a variety of different reasons, such as in response to the user's interaction with user interface elements, a signal from the motion or position sensors, a signal from the touch-sensitive pads 2690, a signal from the pressure sensors, a signal from the other device or system 2670, etc.

Although power source 2650, processor 2660, and communications interface 2680 are illustrated in FIG. 26 as being positioned in haptic device 2620, the present disclosure is not so limited. For example, one or more of power source 2650, processor 2660, or communications interface 2680 may be positioned within haptic device 2610 or within another wearable textile.

Figure 27:
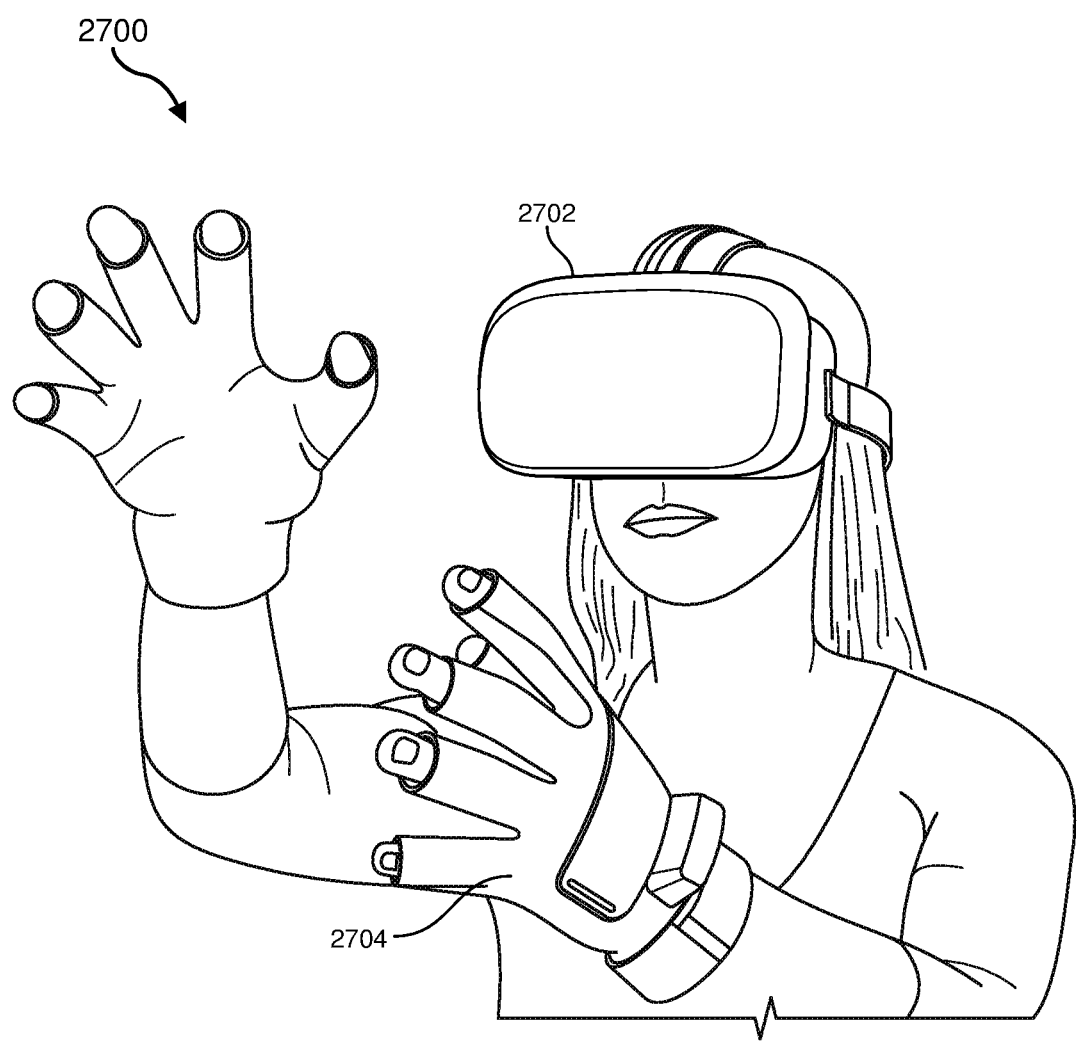
FIG. 27 is an illustration of an exemplary virtual-reality environment according to embodiments of this disclosure.

Haptic wearables, such as those shown in and described in connection with FIG. 26, may be implemented in a variety of types of artificial-reality systems and environments. FIG. 27 shows an example artificial-reality environment 2700 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 25:
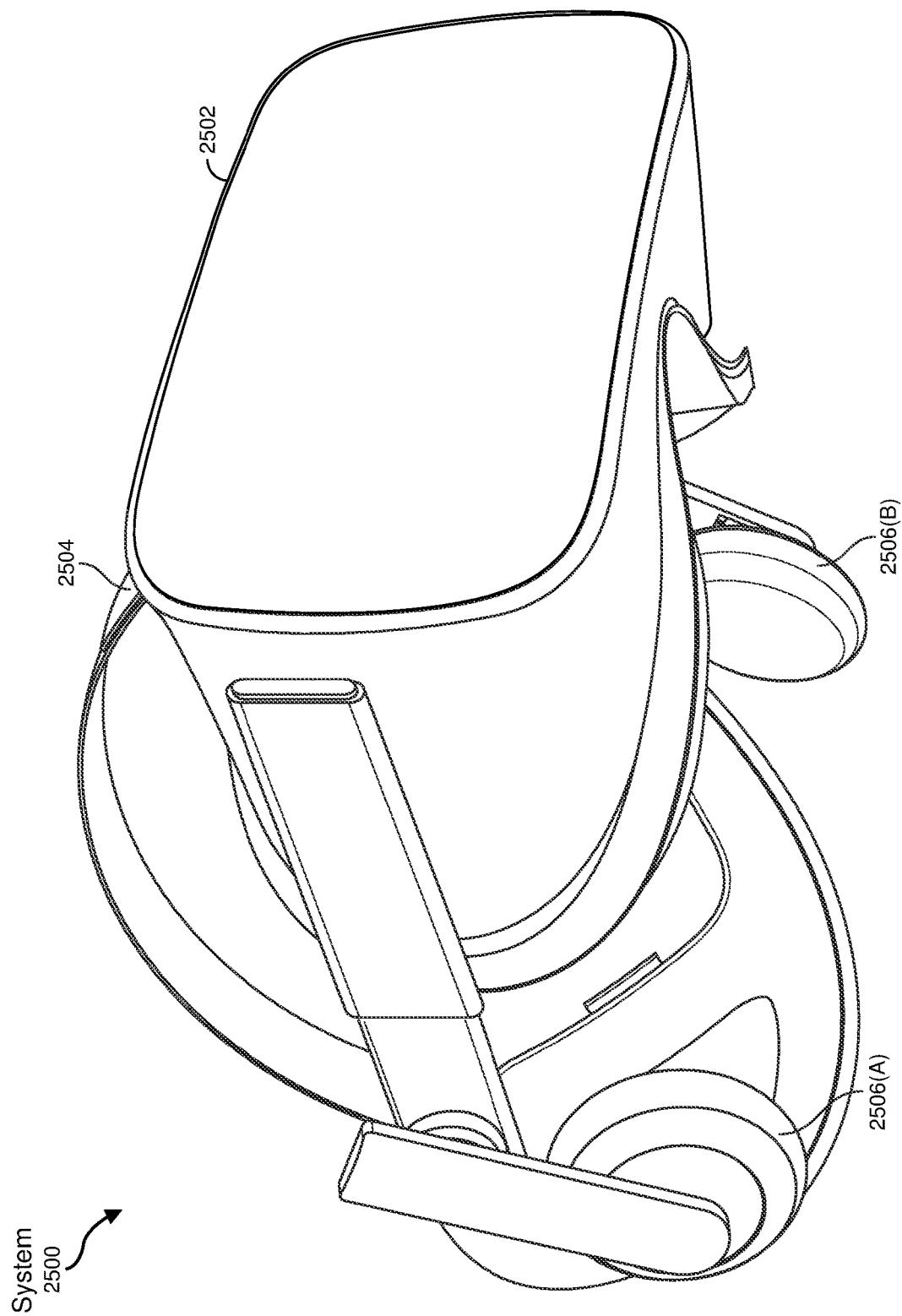
FIG. 25 is an illustration of an exemplary virtual-reality headset that may be used in connection with embodiments of this disclosure.

Head-mounted display 2702 generally represents any type or form of virtual-reality system, such as virtual-reality system 2500 in FIG. 25. Haptic device 2704 generally represents any type or form of wearable device, worn by a user of an artificial-reality system, that provides haptic feedback to the user to give the user the perception that he or she is physically engaging with a virtual object. In some embodiments, haptic device 2704 may provide haptic feedback by applying vibration, motion, and/or force to the user. For example, haptic device 2704 may limit or augment a user's movement. To give a specific example, haptic device 2704 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2704 to send action requests to a console. Examples of action requests include, without limitation, requests to start an application and/or end the application and/or requests to perform a particular action within the application.

Figure 28:
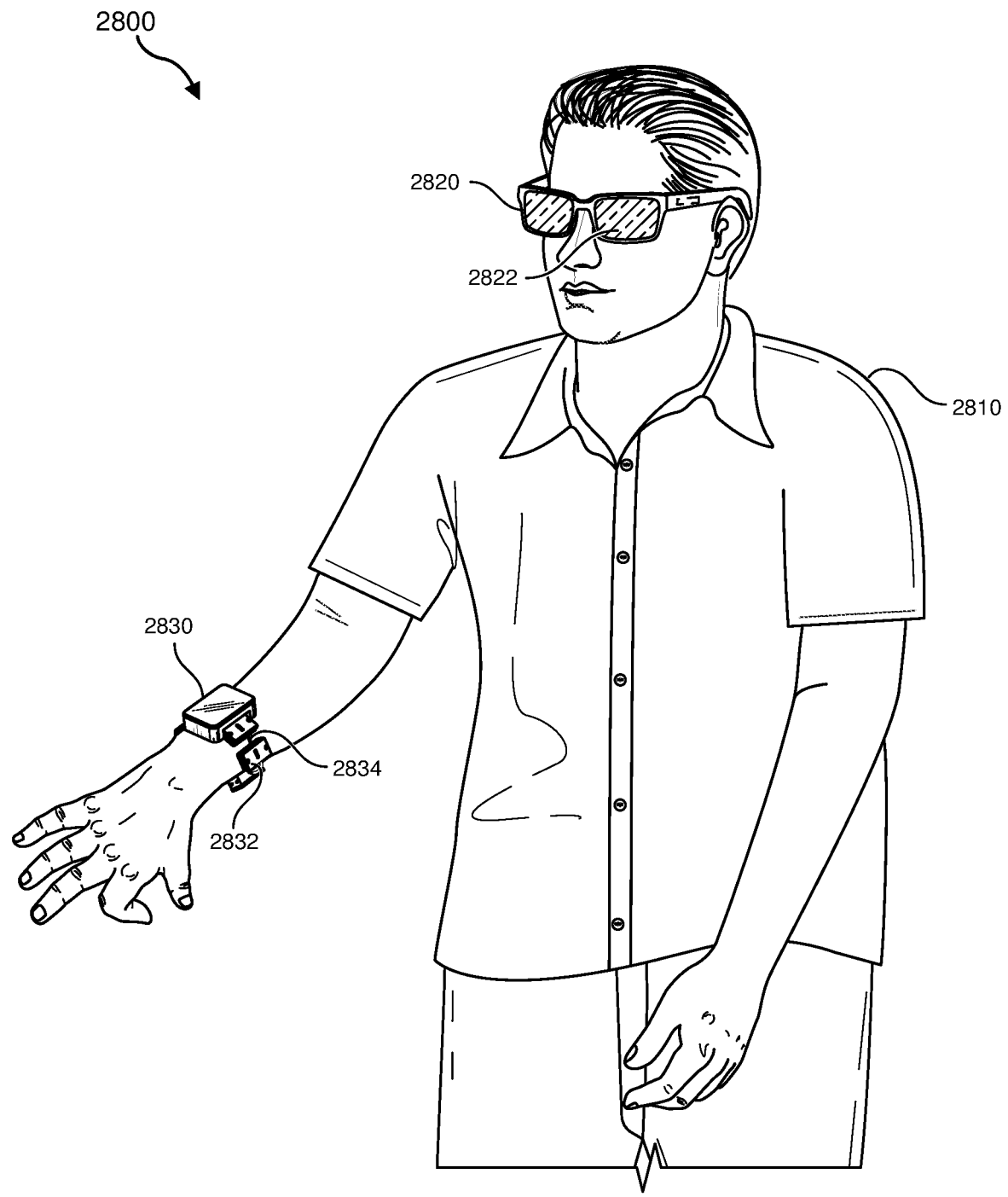
FIG. 28 is an illustration of an exemplary augmented-reality environment according to embodiments of this disclosure.

While haptic interfaces may be used with virtual-reality systems, as shown in FIG. 27, haptic interfaces may also be used with augmented-reality systems, as shown in FIG. 28. FIG. 28 is a perspective view of a user 2810 interacting with an augmented-reality system 2800. In this example, user 2810 may wear a pair of augmented-reality glasses 2820 that may have one or more displays 2822 and that are paired with a haptic device 2830. In this example, haptic device 2830 may be a wristband that includes a plurality of band elements 2832 and a tensioning mechanism 2834 that connects band elements 2832 to one another.

One or more of band elements 2832 may include any type or form of actuator suitable for providing haptic feedback. For example, one or more of band elements 2832 may be configured to provide one or more of various types of cutaneous feedback, including vibration, force, traction, texture, and/or temperature. To provide such feedback, band elements 2832 may include one or more of various types of actuators. In one example, each of band elements 2832 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 2610, 2620, 2704, and 2830 may include any suitable number and/or type of haptic transducer, sensor, and/or feedback mechanism. For example, haptic devices 2610, 2620, 2704, and 2830 may include one or more mechanical transducers, piezoelectric transducers, and/or fluidic transducers. Haptic devices 2610, 2620, 2704, and 2830 may also include various combinations of different types and forms of transducers that work together or independently to enhance a user's artificial-reality experience. In one example, each of band elements 2832 of haptic device 2830 may include a vibrotactor (e.g., a vibrotactile actuator) configured to vibrate in unison or independently to provide one or more of various types of haptic sensations to a user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to identify a group goal, use the result of the transformation to determine group and individual progress toward the goal, and store the result of the transformation to present the determined progress. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A computer-implemented method comprising:
   receiving, by a processor embedded in a mobile electronic device, at least one input identifying, for a group of users, a shared group fitness objective that is attainable through a combined effort of at least two individual users within the group of users, the shared fitness objective having one or more assigned individual goals for at least one individual user of the group of users;
   tracking, via sensor data received from one or more hardware sensors on the mobile electronic device including heart rate data from at least one of an optical heart rate sensor or an electrical heart rate sensor, the individual user's efforts with respect to the identified group fitness objective and with respect to the user's assigned individual goal;
   generating, by the processor, a combined user interface that illustrates both an individual progress indicator illustrating the individual user's efforts with respect to the group fitness objective and with respect to the user's assigned individual goal and a group progress indicator illustrating the group of users' efforts with respect to the group fitness objective, wherein the combined user interface allows the individual user to configure a different appearance for each group progress indicator and each individual progress indicator, wherein each appearance ties the assigned individual goal to its respective group goal; and
   presenting the generated combined user interface on a display.

2. The computer-implemented method of claim 1, wherein each individual user's efforts with respect to the group fitness objective increment the group's progress toward the group fitness objective.

3. The computer-implemented method of claim 1, wherein the one or more hardware sensors comprise at least one of:
   an electrical heart sensor;
   an optical heart sensor;
   a global positioning system (GPS) sensor;
   an inertial measurement unit (IMU);
   an accelerometer;
   a gyroscope;
   a magnetometer;
   a pulse oximeter; or
   an electrochemical sweat sensor.

4. The computer-implemented method of claim 1, wherein the combined user interface comprises a double ring, wherein a first ring of the double ring represents the individual user's efforts with respect to the group fitness objective, and wherein a second ring of the double ring represents the group of users' efforts with respect to the group fitness objective.

5. The computer-implemented method of claim 1, wherein the group fitness objective comprises at least one of a collaborative group fitness objective or a competitive group fitness objective.

6. The computer-implemented method of claim 1, wherein the combined user interface is configured to present at least one of a direct challenge between two specific group users or a group challenge between the group of users.

7. The computer-implemented method of claim 6, wherein results from the group challenge are automatically posted to a social graph associated with the group of users.

8. The computer-implemented method of claim 1, wherein the combined user interface is configured to present one or more user interface elements that facilitate integration with one or more other applications.

9. The computer-implemented method of claim 8, wherein at least one of the one or more other applications accessible through the combined user interface comprises a messaging application that allows the group of users to send messages to each other.

10. The computer-implemented method of claim 8, wherein at least one of the one or more other applications accessible through the combined user interface comprises a social media application that allows the group of users to post stories that are available to specified social media users.

11. The computer-implemented method of claim 1, wherein the combined user interface is configured to present a second, different individual user's efforts with respect to the identified group fitness objective, in addition to the individual progress indicator and the group progress indicator.

12. The computer-implemented method of claim 11, wherein the individual user specifies who the second, different individual user is.

13. A system comprising:
   at least one physical processor; and
   physical memory comprising computer-executable instructions that, when executed by the physical processor, cause the physical processor to:
      receive at least one input identifying, for a group of users, a shared group fitness objective that is attainable through a combined effort of multiple individual users within the group of users, the shared fitness objective having one or more assigned individual goals for at least one individual user of the group of users;
      track, via sensor data received from one or more hardware sensors on the system including heart rate data from at least one of an optical heart rate sensor or an electrical heart rate sensor, an individual user's efforts with respect to the identified group fitness objective and with respect to the user's assigned individual goal;
      generate a combined user interface that illustrates both an individual progress indicator illustrating the individual user's efforts with respect to the group fitness objective and with respect to the user's assigned individual goal, and a group progress indicator illustrating the group of users' efforts with respect to the group fitness objective, wherein the combined user interface allows the individual user to configure a different appearance for each group progress indicator and each individual progress indicator, wherein each appearance ties the assigned individual goal to its respective group goal; and
      present the combined user interface on a display.

14. The system of claim 13, wherein the generated combined user interface includes a virtual workout companion that performs one or more functions with respect to the individual user's efforts in relation to the identified group fitness objective.

15. The system of claim 14, wherein at least one of the one or more functions performed by the virtual workout companion comprises presenting workout metrics for at least one of the virtual workout companion or a second, different individual in the group of users.

16. The system of claim 15, wherein the workout metrics of the virtual workout companion are based on past workout data for one or more users.

17. The system of claim 14, wherein at least one of the one or more functions performed by the virtual workout companion comprises presenting a direct fitness challenge received from another user.

18. The system of claim 17, wherein the combined user interface is configured to present an indication of the individual user's progress toward the direct fitness challenge along with an indication of the other user's progress toward the fitness challenge.

19. The system of claim 13, further comprising:
   tracking one or more self-care indicators for at least one member of the group; and
   providing one or more of the tracked self-care indicators to at least a portion of the group of users.

20. A non-transitory computer-readable medium comprising one or more computer-executable instructions that, when executed by at least one processor of a computing device, cause the computing device to:
   receive at least one input identifying, for a group of users, a shared group fitness objective that is attainable through a combined effort of multiple individual users within the group of users, the shared fitness objective having one or more assigned individual goals for at least one individual user of the group of users;
   track, via sensor data received from one or more hardware sensors including heart rate data from at least one of an optical heart rate sensor or an electrical heart rate sensor, an individual user's efforts with respect to the identified group fitness objective and with respect to the user's assigned individual goal;
   generate a combined user interface that illustrates both an individual progress indicator illustrating the individual user's efforts with respect to the group fitness objective and with respect to the user's assigned individual goal, and a group progress indicator illustrating the group of users' efforts with respect to the group fitness objective, wherein the combined user interface allows the individual user to configure a different appearance for each group progress indicator and each individual progress indicator, wherein each appearance ties the assigned individual goal to its respective group goal; and
   present the combined user interface on a display.

\* \* \* \* \*